(12) United States Patent
Schlee et al.

(10) Patent No.: US 8,851,211 B2
(45) Date of Patent: Oct. 7, 2014

(54) MULTI-UNIT MOBILE ROBOT

(76) Inventors: Keith L. Schlee, Alexandria, VA (US);
Bruce A. Schlee, Oregon, WI (US)

( * ) Notice: Subject to any disclaimer, the term of this patent is extended or adjusted under 35 U.S.C. 154(b) by 214 days.

(21) Appl. No.: 13/247,257

(22) Filed: Sep. 28, 2011

(65) Prior Publication Data

US 2012/0103705 A1    May 3, 2012

Related U.S. Application Data

(60) Provisional application No. 61/388,204, filed on Sep. 30, 2010.

(51) Int. Cl.
| | |
|---|---|
| *B62D 61/10* | (2006.01) |
| *A01B 71/06* | (2006.01) |
| *B25J 9/06* | (2006.01) |
| *B62D 59/04* | (2006.01) |
| *B60B 19/12* | (2006.01) |
| *B25J 5/00* | (2006.01) |
| *B62D 57/024* | (2006.01) |
| *B62D 53/00* | (2006.01) |
| *B60B 19/00* | (2006.01) |

(52) U.S. Cl.
CPC . *B25J 9/06* (2013.01); *B62D 59/04* (2013.01); *B60B 19/12* (2013.01); *B25J 5/007* (2013.01); *B60B 2200/49* (2013.01); *A01B 71/066* (2013.01); *B62D 61/10* (2013.01); *B25J 9/065* (2013.01); *B62D 57/024* (2013.01); *B62D 53/00* (2013.01); *B60B 19/003* (2013.01)
USPC .......................................... 180/14.1; 280/412

(58) Field of Classification Search
USPC ........... 180/7.1, 8.2, 9.32, 14.1, 24.08; 901/1; 280/411.1, 412
See application file for complete search history.

(56) References Cited

U.S. PATENT DOCUMENTS

| | | | | | |
|---|---|---|---|---|---|
| 647,244 | A | * | 4/1900 | Anderson | 180/14.1 |
| 1,305,228 | A | * | 5/1919 | Maxwell | 180/14.1 |
| 1,336,665 | A | * | 4/1920 | Underhil et al. | 280/408 |
| 1,566,495 | A | * | 12/1925 | Mallard | 446/451 |
| 2,693,051 | A | * | 11/1954 | Cavanagh | 446/451 |
| 2,699,957 | A | * | 1/1955 | White | 280/485 |
| 3,161,172 | A | * | 12/1964 | Kassbohere | 440/12.57 |
| 3,351,037 | A | * | 11/1967 | Ernst | 440/12.66 |
| 3,376,945 | A | * | 4/1968 | Kaprelian et al. | 180/6.48 |
| 3,414,072 | A | * | 12/1968 | Hodges, Jr et al. | 180/24 |
| 3,540,151 | A | * | 11/1970 | Ishida | 446/90 |
| 4,063,748 | A | * | 12/1977 | Schmidt | 56/7 |
| 4,557,534 | A | * | 12/1985 | Dahnert | 312/201 |
| 4,674,585 | A | * | 6/1987 | Barlow et al. | 180/14.1 |

(Continued)

*Primary Examiner* — Anne Marie Boehler
*Assistant Examiner* — Maurice Williams
(74) *Attorney, Agent, or Firm* — Fredrikson & Byron, P.A.

(57) ABSTRACT

A multi-unit mobile robot comprising a plurality of separate carriages or units linked together by linkages. Each unit comprises hinged first and second segments which facilitates pitch relative motion between the segments, and accordingly the units. By controlling actuators to the hinges, one can cause the robot to coil around and compress against the exterior, or compress against the interior, of an object to be traversed. The linkage between mobile units facilitates at least one of lateral pivot or yaw relative motion between units, and optionally roll. Each hinged platform is carried by a pair of Mecanum wheels, which facilitate movement of the unit in any direction.

Among other possible uses, the multi-unit mobile robot can be used to service windmill blades and towers, and carrying cargo up and down windmill towers by directing a multi-unit mobile robot to wrap around the and traverse the tower.

16 Claims, 20 Drawing Sheets

(56) References Cited

U.S. PATENT DOCUMENTS

| | | | |
|---|---|---|---|
| 4,813,906 A | 3/1989 | Matsuyama et al. | |
| 4,817,747 A * | 4/1989 | Kopczynski | 180/22 |
| 4,878,451 A * | 11/1989 | Siren | 440/12.66 |
| 4,932,491 A * | 6/1990 | Collins, Jr. | 180/9.32 |
| 4,951,768 A * | 8/1990 | Littmann et al. | 180/14.1 |
| 5,129,854 A * | 7/1992 | Hill | 446/465 |
| 5,363,935 A * | 11/1994 | Schempf et al. | 180/9.1 |
| 5,752,871 A * | 5/1998 | Tsuzuki | 446/457 |
| 5,857,534 A | 1/1999 | DeVault et al. | |
| 5,871,386 A * | 2/1999 | Bart et al. | 446/460 |
| 6,234,866 B1 | 5/2001 | Ben-Yakar et al. | |
| 6,512,345 B2 * | 1/2003 | Borenstein et al. | 318/568.12 |
| 6,523,629 B1 * | 2/2003 | Buttz et al. | 180/167 |
| 6,575,802 B2 * | 6/2003 | Yim et al. | 446/91 |
| 6,686,717 B2 | 2/2004 | Khairallah | |
| 6,774,597 B1 | 8/2004 | Borenstein | |
| 6,870,343 B2 | 3/2005 | Borenstein et al. | |
| 7,137,465 B1 | 11/2006 | Kerrebrock et al. | |
| 7,363,994 B1 | 4/2008 | DeFazio et al. | |
| 7,387,179 B2 | 6/2008 | Anhalt et al. | |
| 7,400,108 B2 | 7/2008 | Minor et al. | |
| 7,475,745 B1 * | 1/2009 | DeRoos | 180/9.34 |
| 7,568,536 B2 | 8/2009 | Yu et al. | |
| 7,793,743 B2 | 9/2010 | Kamimura | |
| 7,798,264 B2 * | 9/2010 | Hutcheson et al. | 180/65.1 |
| 7,845,440 B2 | 12/2010 | Jacobsen | |
| 8,185,241 B2 * | 5/2012 | Jacobsen | 700/250 |
| 8,333,401 B2 * | 12/2012 | Lares | 280/474 |
| 2002/0036108 A1 * | 3/2002 | Jeswine et al. | 180/164 |
| 2006/0070775 A1 | 4/2006 | Anhalt et al. | |
| 2007/0080001 A1 | 4/2007 | Beck et al. | |
| 2008/0164079 A1 | 7/2008 | Jacobsen | |
| 2009/0025988 A1 | 1/2009 | Jacobsen et al. | |
| 2009/0030562 A1 | 1/2009 | Jacobsen et al. | |
| 2010/0143089 A1 | 6/2010 | Hvass et al. | |
| 2012/0049012 A1 * | 3/2012 | Ba-Abbad et al. | 248/70 |

* cited by examiner

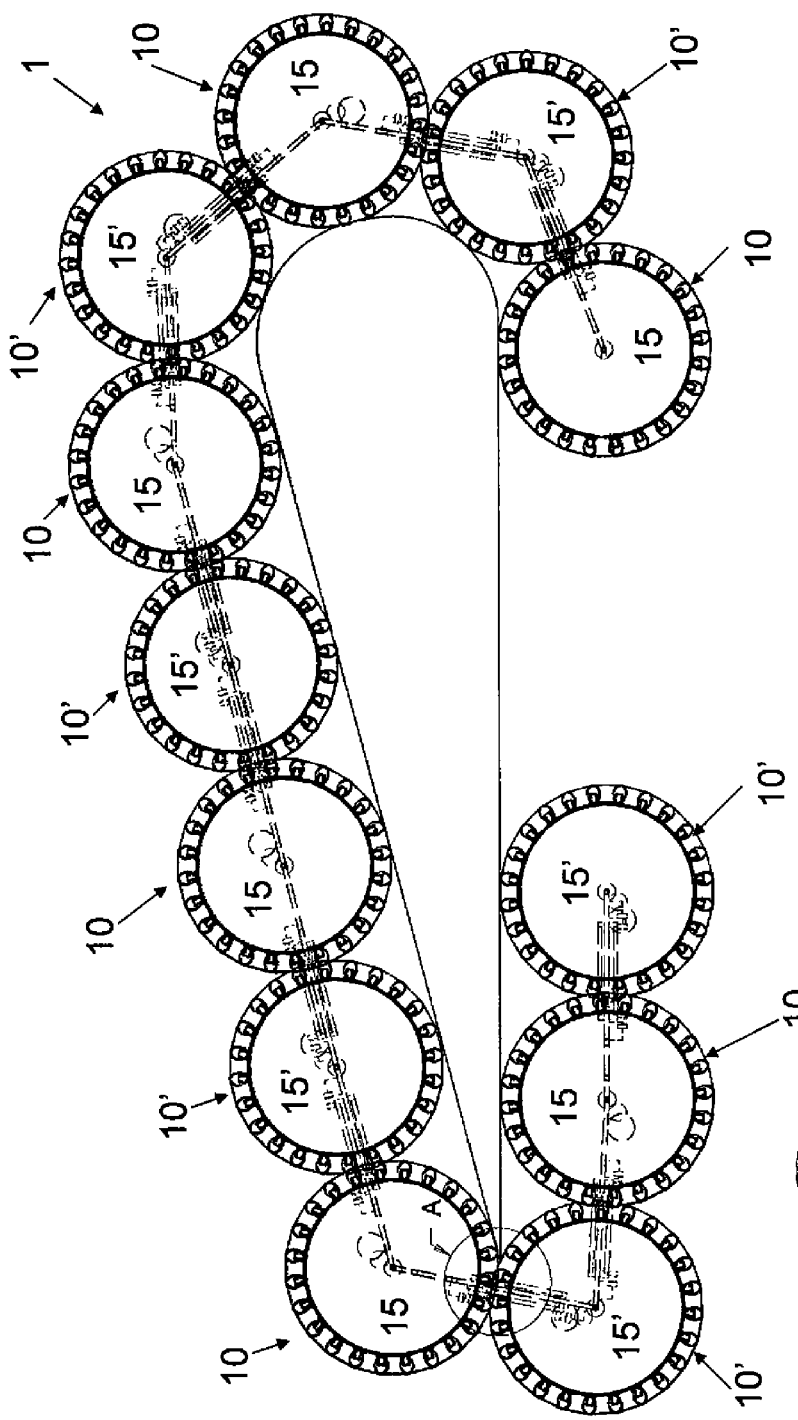
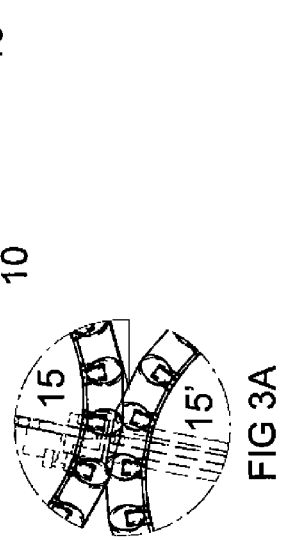
FIG 3
FIG 3A

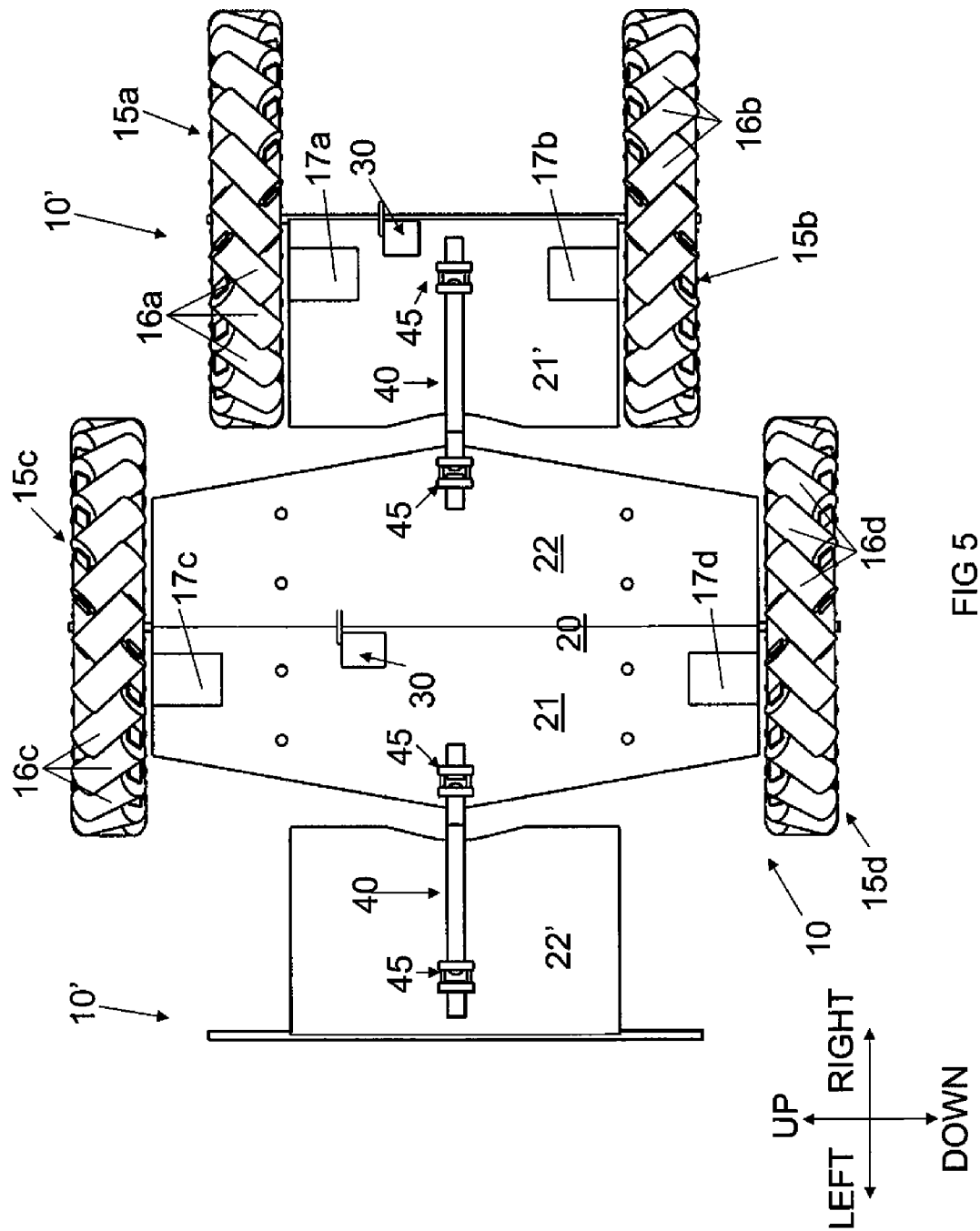

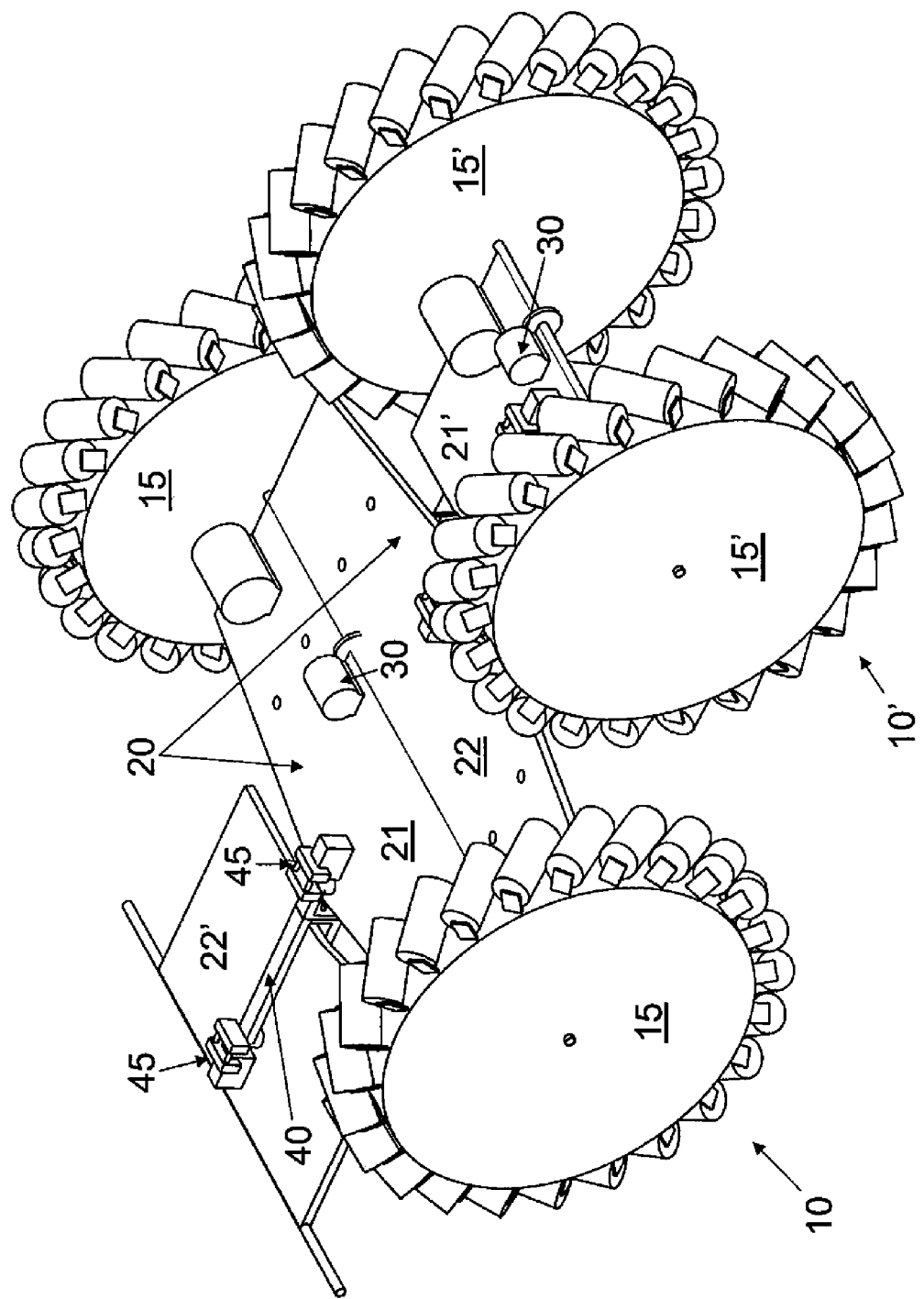

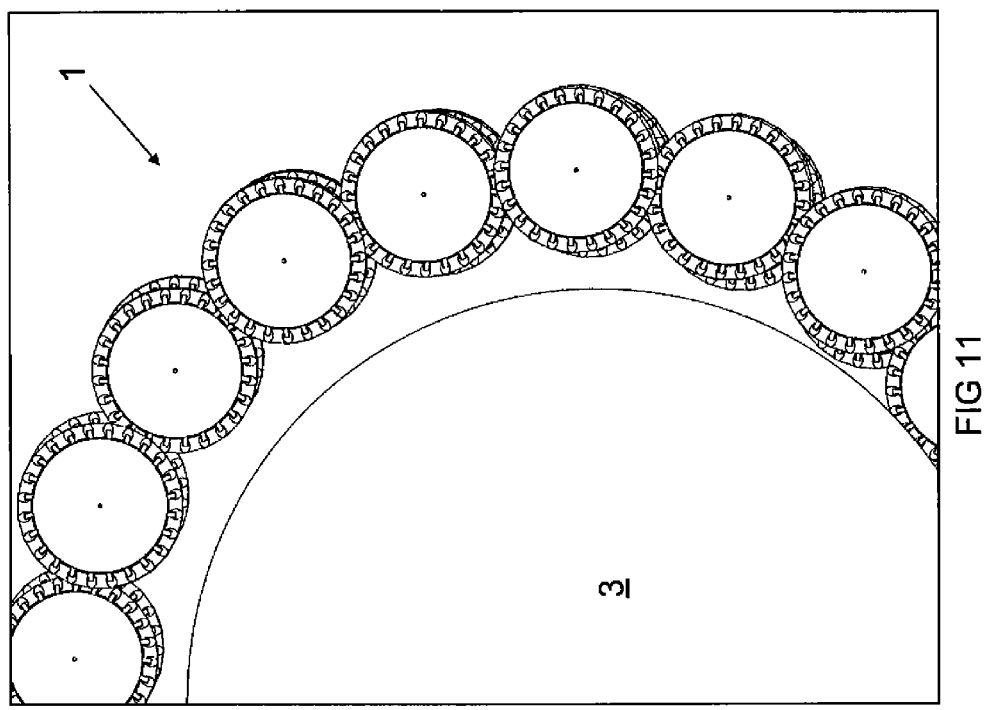

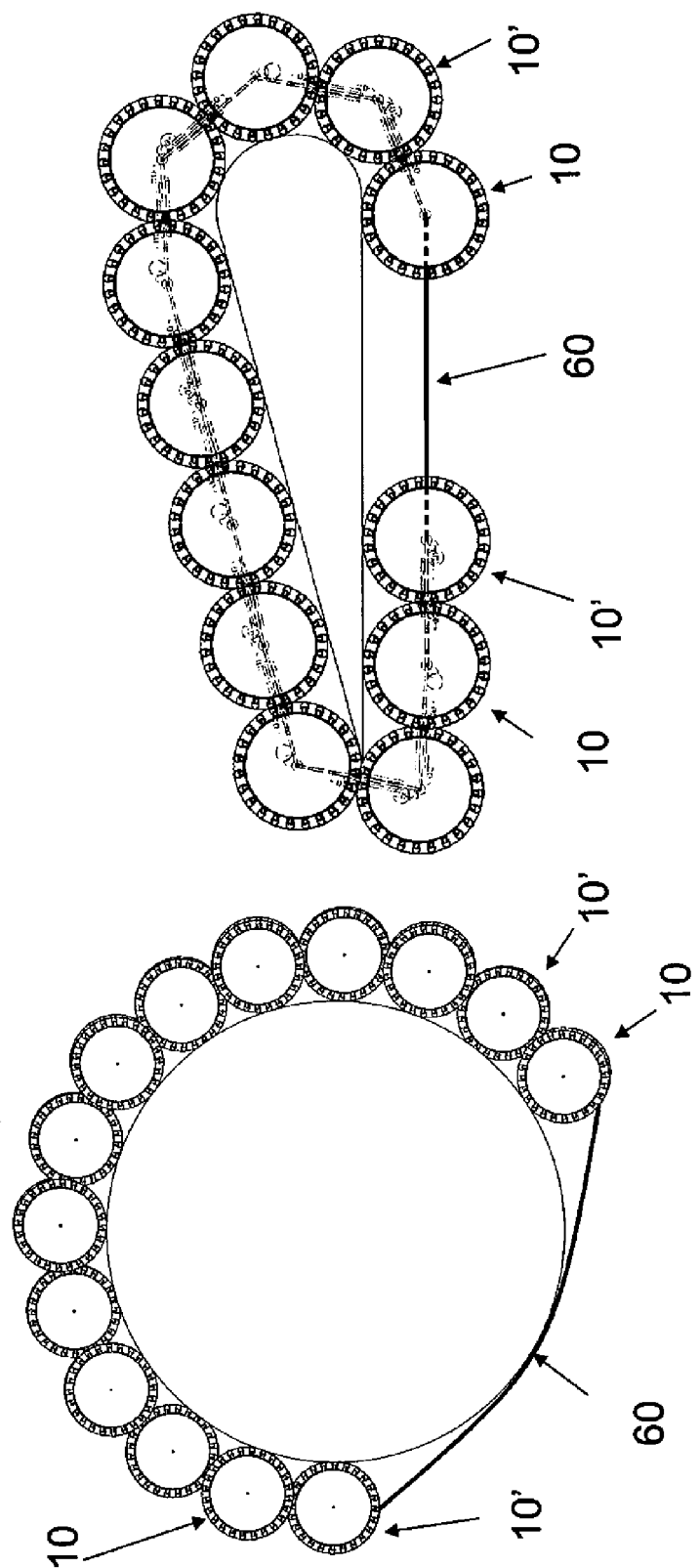

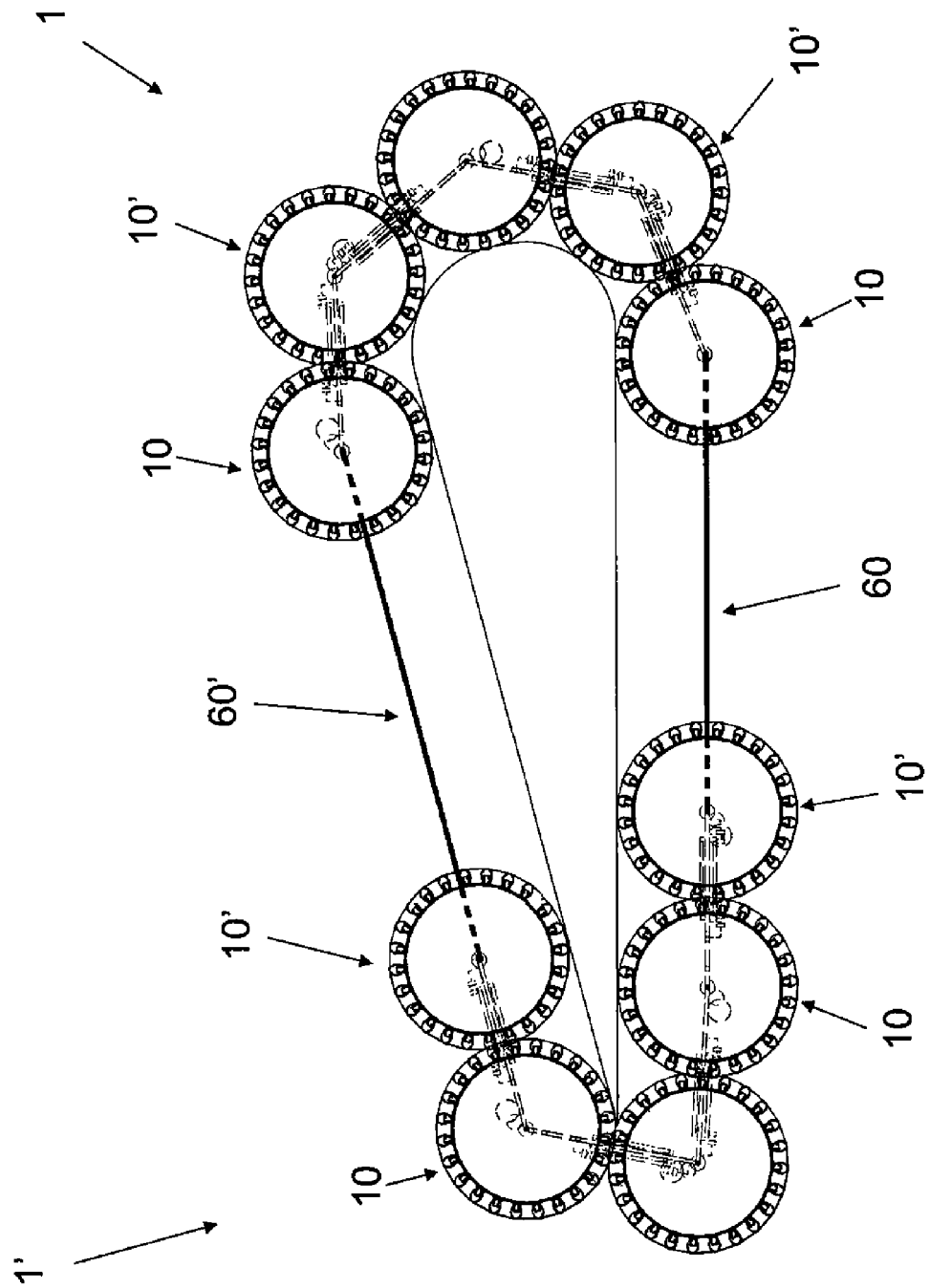

MULTI-UNIT MOBILE ROBOT

REFERENCE TO RELATED APPLICATION

This application claims priority to U.S. provisional patent application Ser. No. 61/388,204 filed Sep. 30, 2010.

FIELD OF THE INVENTION

The present invention relates to multi-unit mobile robots.

SUMMARY OF THE INVENTION

The present invention is a multi-unit mobile robot comprising a plurality of separate carriages or units linked together by linkages. Each unit comprises hinged first and second segments which facilitates pitch relative motion between the segments, and accordingly the units. By controlling actuators to the hinges, one can cause the robot to coil around and compress against the exterior, or compress against the interior, of an object to be traversed.

Preferably, the linkage between mobile units facilitates at least one of lateral pivot or yaw relative motion between units. The lateral pivot and/or yaw motions allow the multi-unit mobile robot to wrap around the object in a helical fashion, and it can be long enough that its ends can overlap.

Also preferably, the linkage also facilitates roll between units. The optional roll feature allows the wheels of the units to maintain contact with an irregular work surface.

In a preferred embodiment, each hinged platform is carried by a pair of Mecanum wheels, which facilitate movement of the unit in any direction. In the preferred embodiment, the pitch axis is concentric with the Mecanum wheel axis of rotation. On regular work surfaces where end overlap is not required, the robot can function using pitch control only. Lateral pivot and/or yaw are or is required only if it is intended or desirable to allow the multi-unit mobile robot to lap itself in wrapping around the object to be traversed.

Also preferably, alternating units are of differing widths, and the wheels on the units are sufficiently large that they capable of overlapping, thereby enabling the robot to navigate very sharp edges or corners in the surface of an object being traversed by the robot, with the wheels always maintaining contact with the surface being traversed.

In another aspect of the invention, the invention comprises a method of servicing windmill blades and towers by directing a multi-unit mobile robot to wrap around and traverse the exterior of such a blade or tower, while cleaning, inspecting, resurfacing or painting the blade and/or tower.

In another aspect of the invention, the invention comprises a method of carrying cargo up and down windmill towers by directing a multi-unit mobile robot to wrap around the and traverse the tower.

These and other aspects and features of the invention will be more fully understood and appreciated by reference to the appended drawings and the description of the preferred embodiments.

BRIEF DESCRIPTION OF THE DRAWINGS

FIG. 3 is a side elevation of the multi unit robot wrapped around a wind turbine blade;

FIG. 3A is the detail A of FIG. 3, showing the overlap of wheels 15 and 15' as the multi-unit mobile robot rounds the edge of the wind turbine blade;

FIG. 5 is a plan view of a robot unit 10 joined to the platform units 21' and 22' of adjacent robot units 10';

FIG. 6 is a perspective view of the structure shown in FIG. 5;

FIG. 11 is a side elevation of a multi-unit mobile robot pitching up and out of contact with a work surface of an object 3, as might be done to clear an obstacle on the surface;

FIG. 23 is an alternate embodiment in which clamping force around a cylindrical surface is augmented by use of a flexible device under tension;

FIG. 24 is an alternate embodiment in which clamping force around an airfoil surface is augmented by use of a flexible device under tension;

FIG. 25 is an alternate embodiment in which clamping force around an airfoil surface is augmented by the use of a flexible device under tension connecting two independent robots.

DESCRIPTION OF THE PREFERRED EMBODIMENTS

Figure 1:
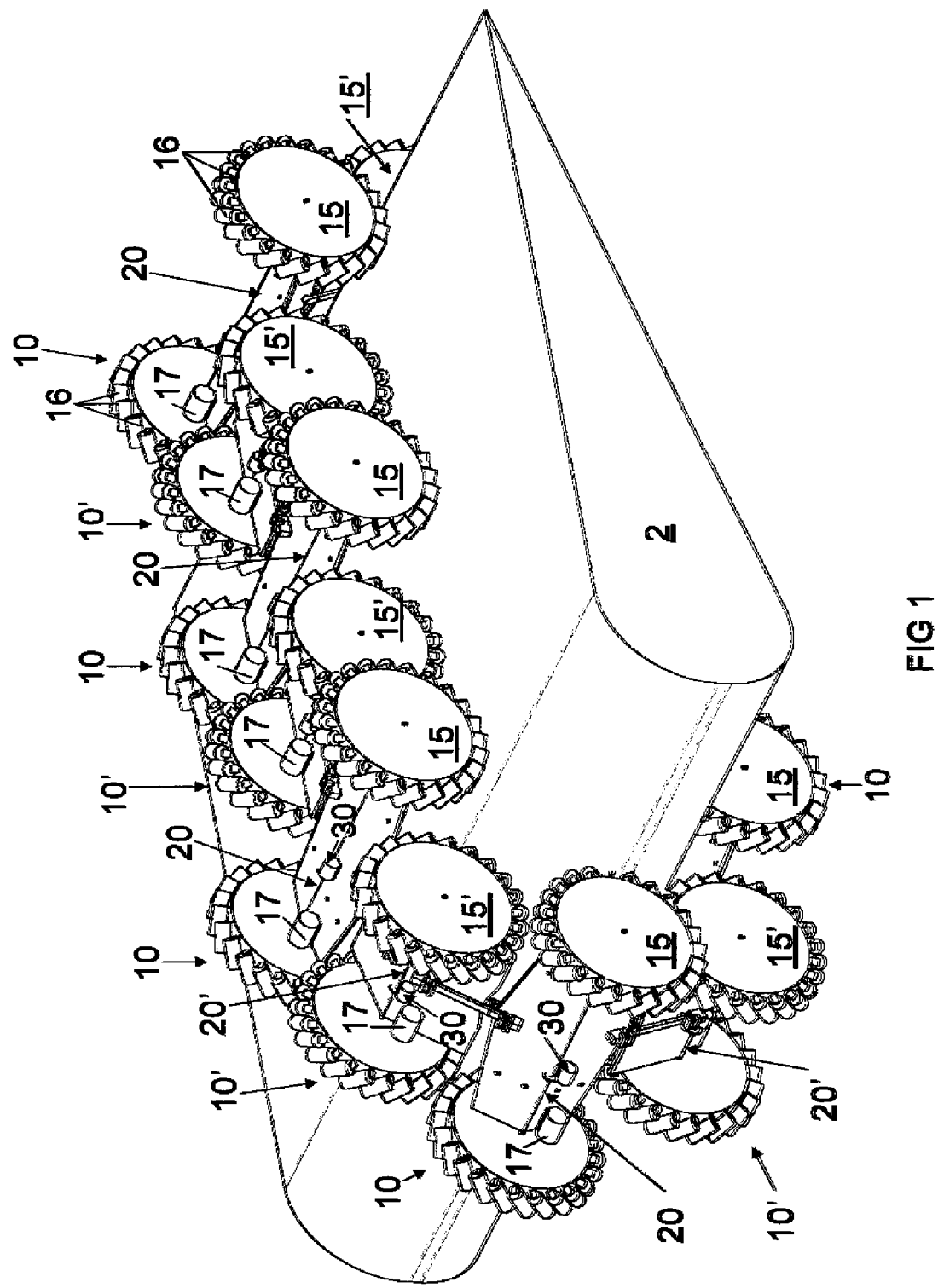
FIG. 1 is a perspective view of a preferred embodiment multi-unit mobile robot wrapped around a wind turbine blade.
Figure 2:
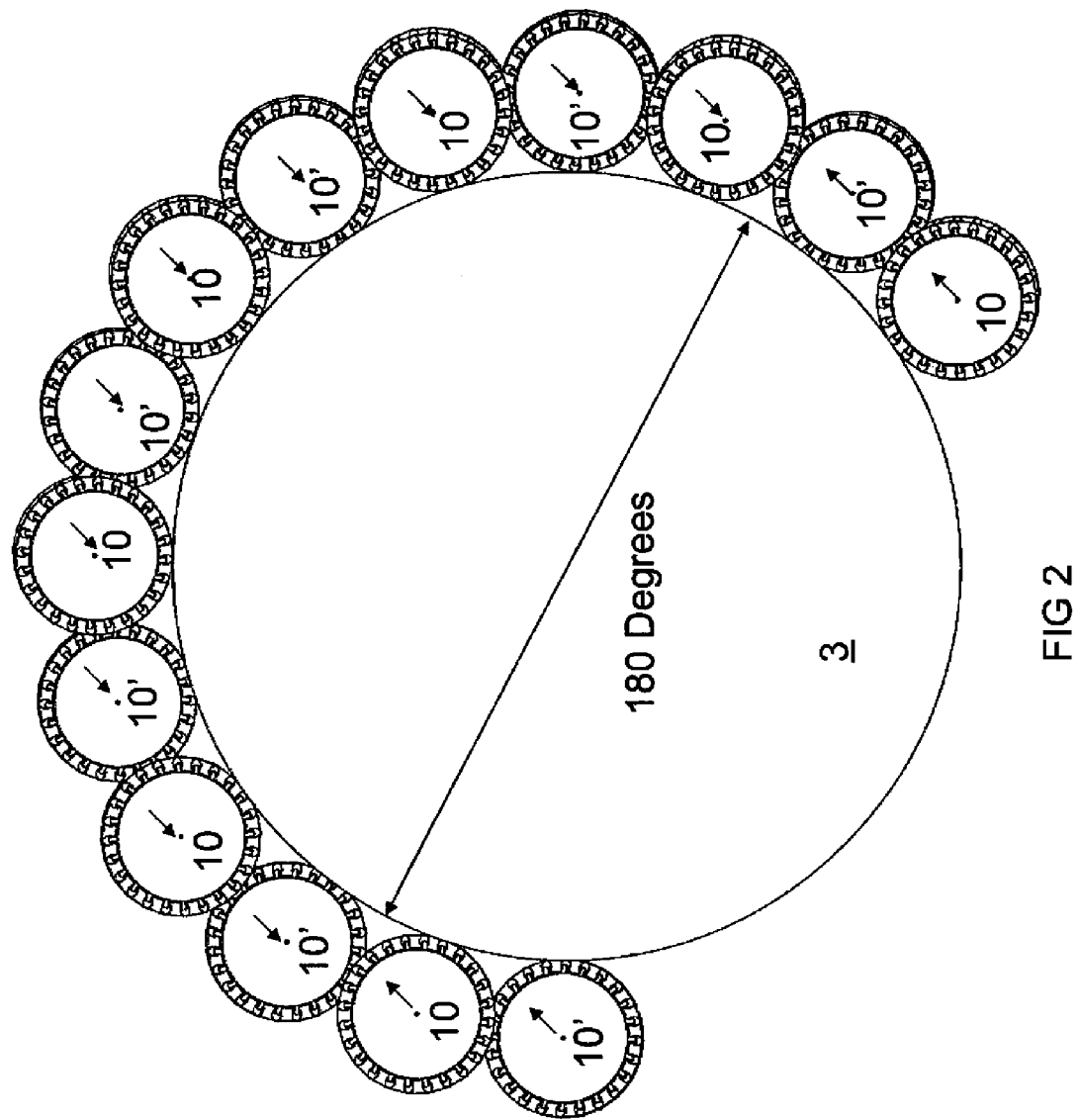
FIG. 2 is a side elevation of the multi unit robot wrapped around a cylindrical surface.
Figure 4:
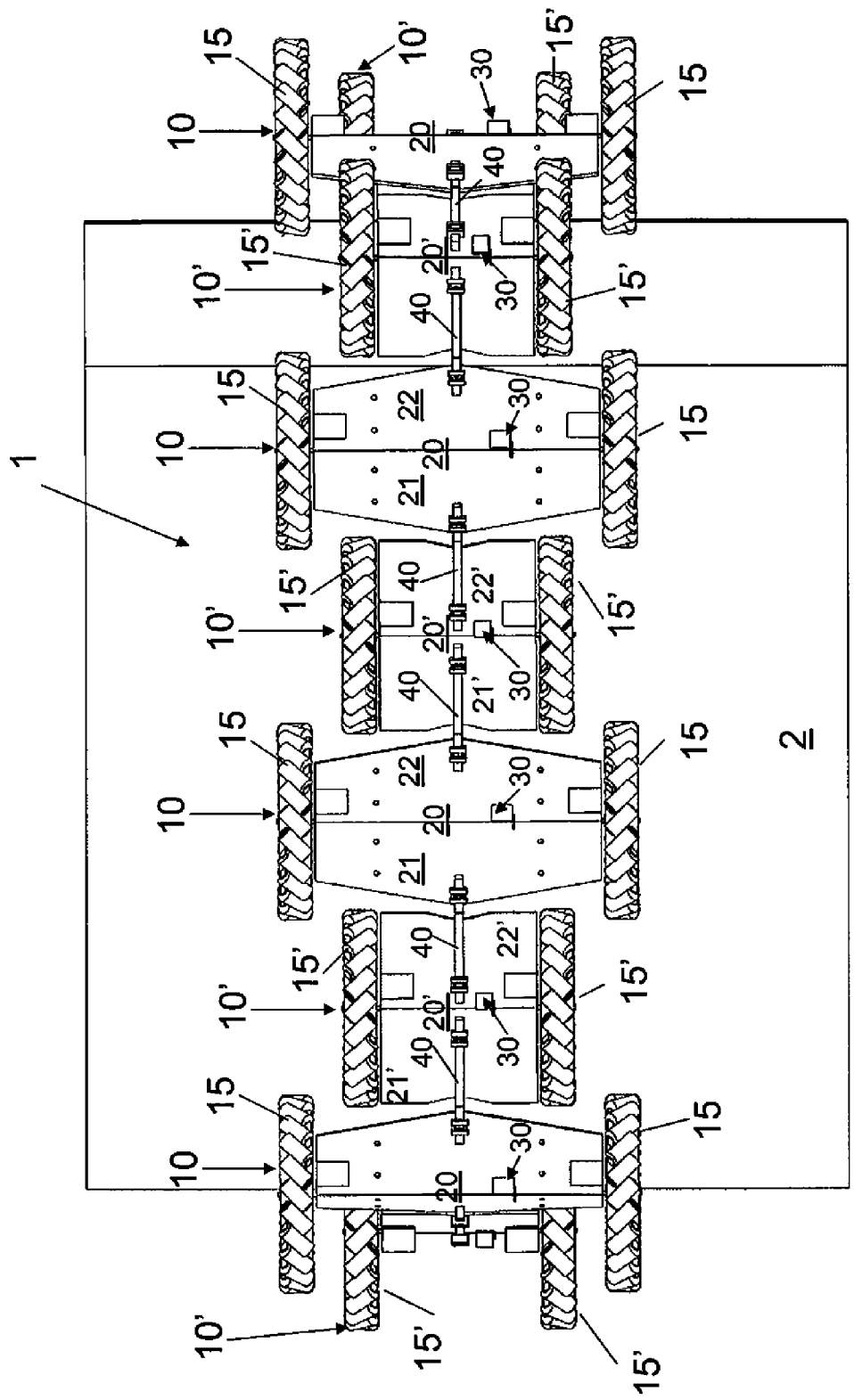
FIG. 4 is a plan view of the robot traversing the surface of a wind turbine blade.

In the preferred embodiment, multi-unit mobile robot 1 is capable, given an appropriate length, of compressing around the outside of, or pushing against the inside of, a work surface of an object 2 or 3 which encompasses an arc of greater than 180° (See FIGS. 1, 2). The multi-unit mobile robot comprises a plurality of robot units 10 and 10' connected together by links 40 (FIGS. 4-6). Units 10 and 10' are similar in construction, except that unit 10 is slightly wider than unit 10', such that units 10 and 10' can be joined in alternating fashion with their wheels 15 and 15' being capable of overlapping without interference to allow the multi-unit robot 1 to pass over sharp edges (FIGS. 1, 3, 3A and 4-6). If the object being traversed does not contain sharp edges (shown as object 3 in FIG. 10), wheel overlap is not a requirement. Each unit 10 and 10' includes a hinged platform 20 or 20' located between wheels 15 and preferably within the confines thereof (FIGS. 1 and 4-6).

Figure 18:
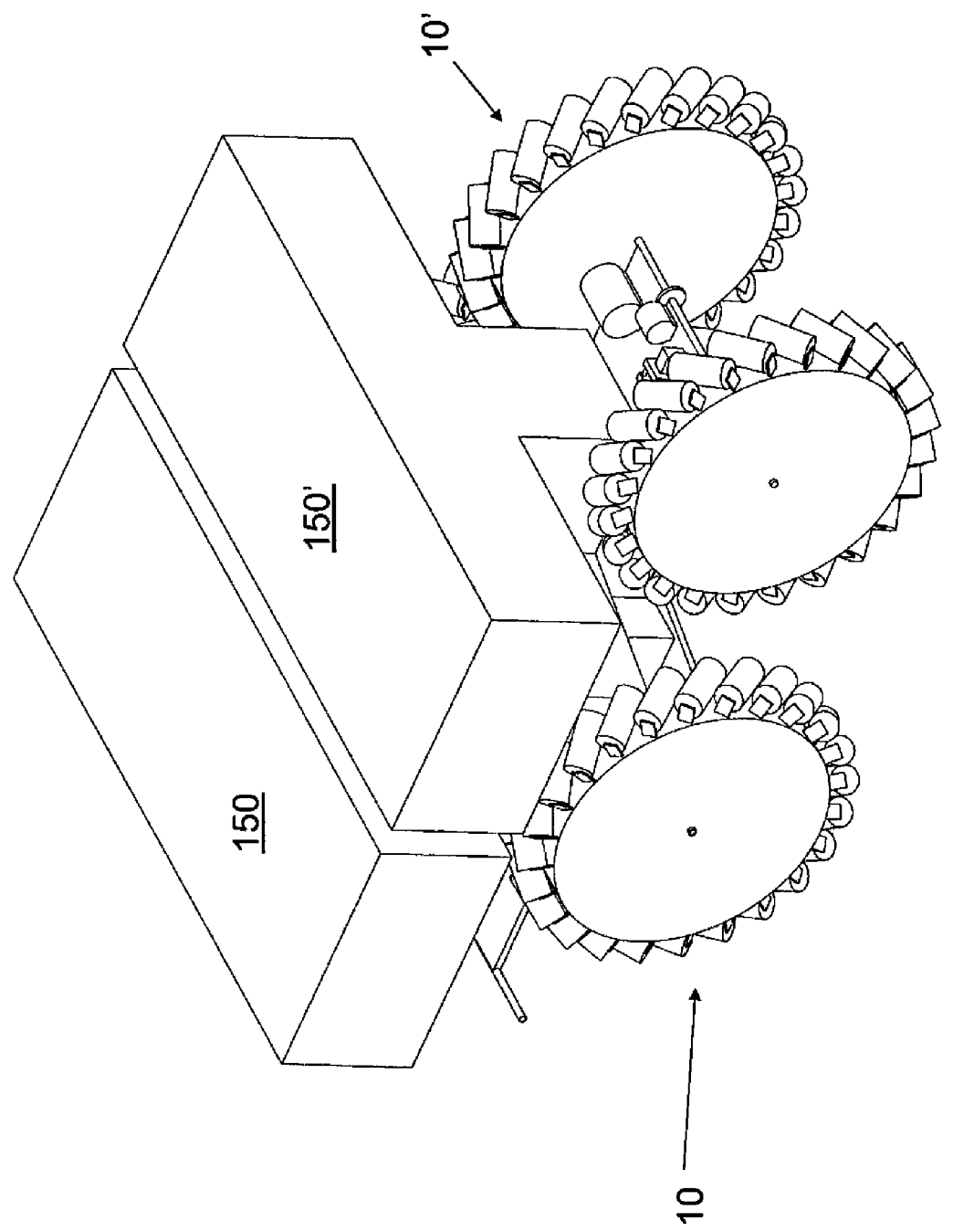
FIG. 18 is a perspective view of a box representation of a payload on the robot.

Each platform 20, 20' comprises a pair of hingedly joined platform segments 21 and 22, or 21' and 22' (FIGS. 4-6), respectively, which can carry any desired payload. In the embodiment of the multi-unit mobile robot shown, the payload 150 or 150' (shown as a box in FIG. 18) carried by each hinged platform would be a spray painting device, cleaning device, or other servicing device so that the multi-unit mobile robotic device can be used to clean, paint, or perform other maintenance to the blades of a wind turbine. For tower applications, the pay load 150 or 150' would be a crane device which the multi-unit robot would transport to the desired location on the wind tower.

The multi-unit robot can also be thought of as a plurality of segments 21, 22, 21' and 22' joined to each other alternatively by hinges which facilitate pitch motion, and linkages which optionally feature lateral pivot, yaw, and/or roll motion.

Each unit 10,10' may include quick connect/disconnect interfaces for electrical power, control communications, communication, pneumatic/hydraulic lines for use by payload and robot unit, if required, and application liquid lines for use by payload, if required. The platforms 20 and 20' can be made to a size which provides room to install all equipment necessary to make it and the payload self contained (e.g. batteries, tanks, wireless communication, etc.). This would be desirable if the chassis needs to navigate around supporting structure or large obstacles that make lines impractical (e.g. pipeline supports). Each unit 10, 10' is preferably 100% electrical for precise control capability and mass savings. However, the large forces required to enable the multi-unit mobile robot to adhere to the work surface may necessitate the use of hydraulic or pneumatic actuators in lieu of electric components.

Figure 8:
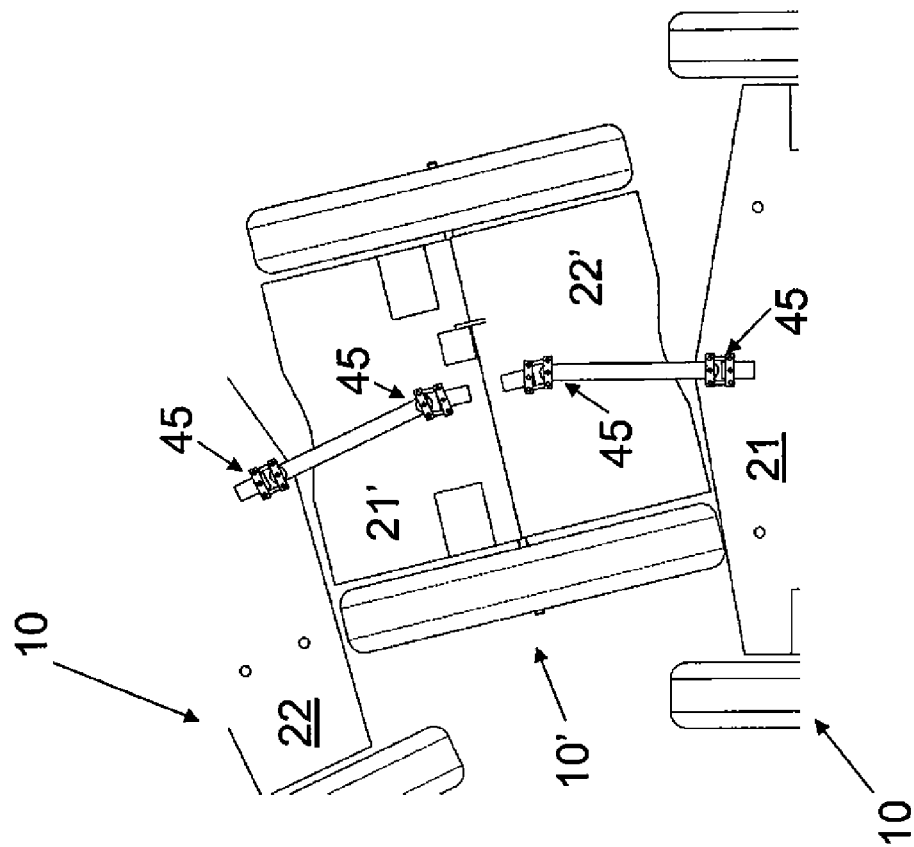
FIG. 8 is a plan view of adjacent robot units linked in pivotal orientation.
Figure 7:
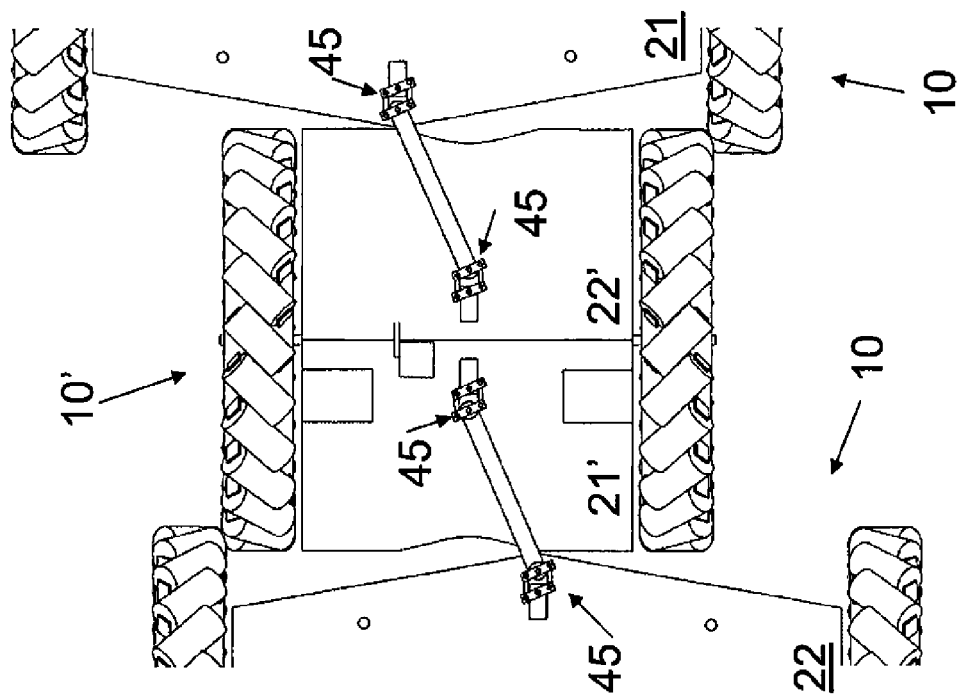
FIG. 7 is a plan view showing a robot unit linked to two adjacent units, in yaw orientation.
Figure 9:
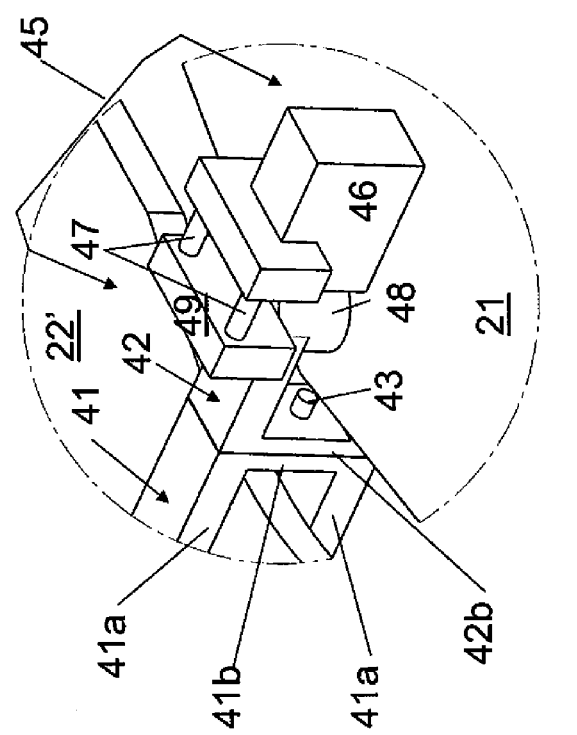
FIG. 9 is a perspective view of a yaw actuator, with adjacent link members joined to each other in rotatable orientation.

Multi-unit robot 1 is capable of movement in any direction on a work surface through the use of individually driven Mecanum wheels, as wheels 15 and 15'. The multi-unit robot 1 clamps (compresses) around the outside or against the interior of a work surface through control of the pitch motion between the hingedly joined platform segments 21 and 22, and 21' and 22' (FIG. 1). Each unit is also capable of pivot, yaw and roll motion relative to its adjacent units through control mechanisms associated with links 40 (FIGS. 7-9).

Compression of the device against the outside or inside of a work surface is achieved by a pitch actuator 30, e.g. a motor, servo, or linear actuator, on each platform 20, 20' which acts to fold the platform segments 21, 22 or 21', 22' towards one another, with a biasing torque in accordance with controller instruction (FIGS. 1 and 4-6). Links 40 do not permit pitch motion between units 10 and 10', such that adjacent planar segments 22' and 21, and 22 and 21', tend to be forced down (or up) against the work surface in a compressing (or outwardly forcing) motion as a result of actuator 30 causing a pitching motion between hinged segments 21 and 22, or 21' and 22'. This action occurring simultaneously in multiple robot units 10 and 10' causes the multi-unit robot 1 to clamp against any surface which is encompassed to the extent of more than 180 degrees by the multi-unit robot 1 (FIG. 2).

Stated another way, the adjoining units 10 and 10' thereby tend to mutually force each other against the work surface upon which they are riding, such that if the device encompasses an arc of greater than 180° to achieve clamping force equilibrium, the multi-unit robotic device as a whole tends to exert a clamping force against the work surface on either side of the arc. Through a control system, the torque exerted by pitch actuators 30 can be varied using the control system for the device. In this way, the degree of compression of the unit against the work surface can be varied. The amount of compression required is a function of the mass of robot 1 and the coefficient of friction between the Mecanum wheels and the work surface.

Figure 21:
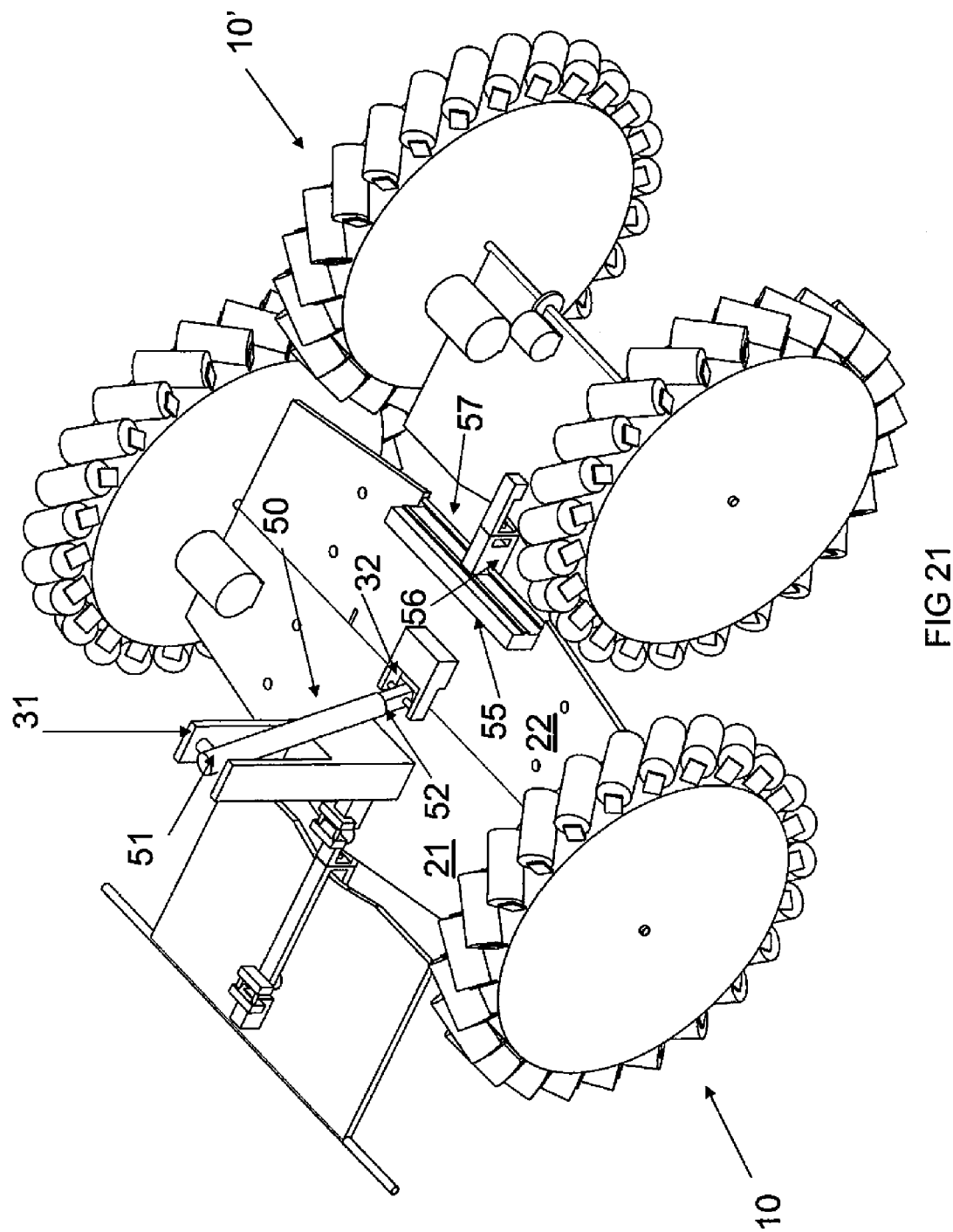
FIG. 21 is an alternate embodiment in which pitch and yaw are achieved by powered linear actuators.
Figure 22:
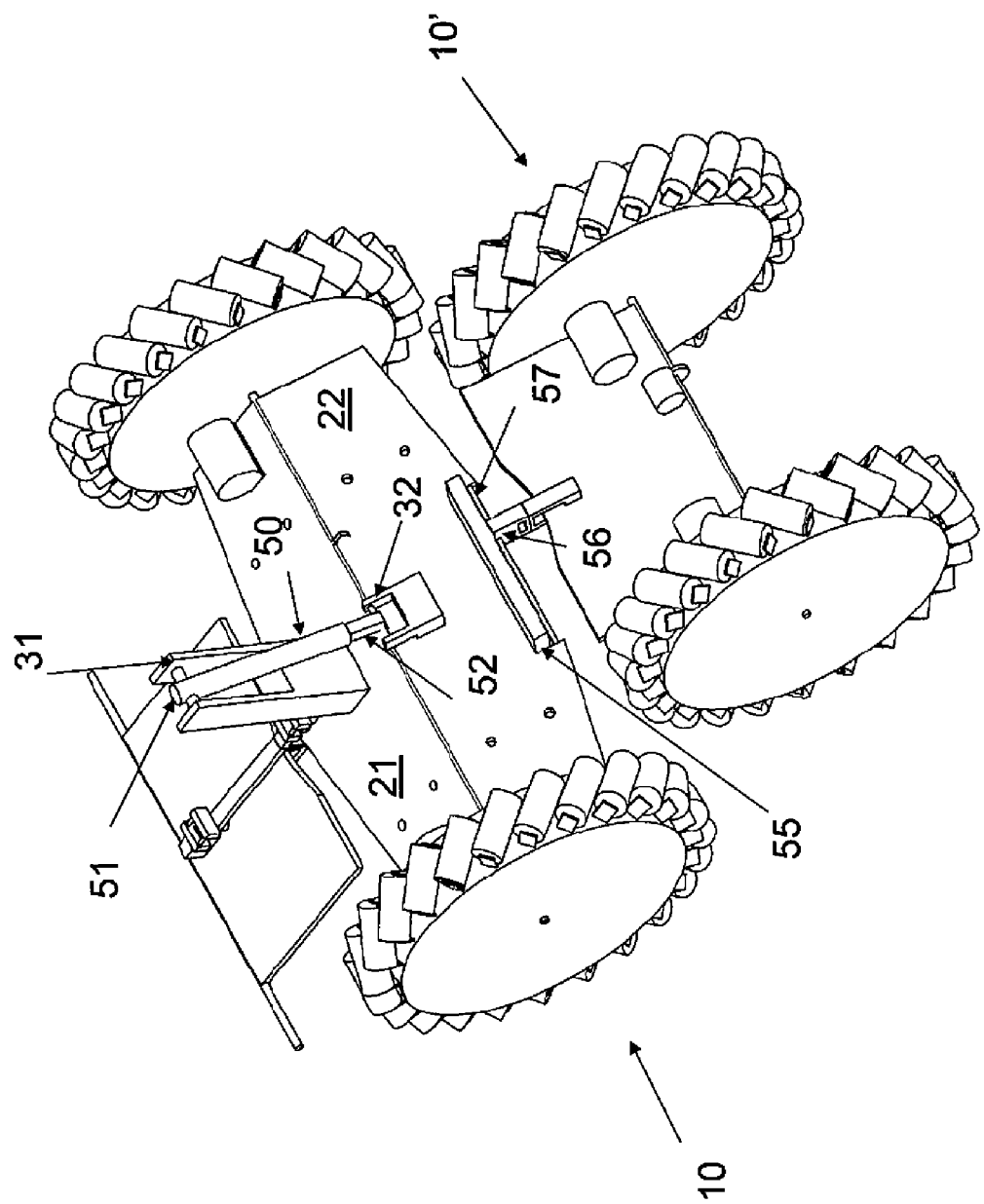
FIG. 22 is an alternate view of FIG. 21 showing pitch and yaw being achieved by powered linear actuators.

In the embodiment shown in FIG. 21, pitch actuator 30 comprises a tower bracket 31 mounted on platform segment 21, and a linear actuator 50 which is pivotally attached at one end to the top of tower bracket 31, and at its other end to the free end of a lever 32. The opposite end of lever 32 is mounted to platform segment 22. Linear actuator 50 can be an electric solenoid type device, a pneumatic or hydraulic cylinder, or an electric or pneumatic or hydraulic driven screw type device (e.g. worm drive). Regardless, actuator 50 comprises a base 51 and a rod 52 which extends or retracts from the base. In so doing, actuator 50 changes the angle of the platform segments 21 and 22 relative to each other and/or the compressive force exerted by adjacent carriages 10 and 10' (FIG. 22). This method of pitch actuation is desired if a large amount of compression needs to be applied to the work surface to ensure wheel traction.

The lateral pivot or yaw movement between adjacent units 10 and 10' is achieved by each of the links 40 being pivotably connected at each end to yaw actuators 45 (FIGS. 5 and 6), one of which is mounted on the platform 20 of a unit 10 and the other of which is mounted on the platform 20' of an adjacent unit 10'. Specifically, one yaw actuator 45 mounted on the hinged platform member 21 of unit 10 is joined to one end of a link 40 and the other end of link 40 is joined to another actuator 45 is mounted on the hinged platform 22' of the adjacent unit 10'. Similarly another link 40 is connected to and extends between a yaw actuator 45 mounted on hinged platform segment 22 of unit 10 and another yaw actuator 45 mounted on the succeeding hinged platform 21' of adjacent unit 10' (FIGS. 5-9).

Each link 40 comprises a primary link 41, preferably "U" shaped to capture bending moments, comprising spaced legs 41a joined by a base member 41b (FIG. 9). Legs 41a are connected at their free ends to a servo or motor driven yaw actuator 45. The spaced legs 41a embrace the platform to which the free ends of legs 41a are connected. The base member 41b is spaced from the edge of the platform to allow a degree of motion of primary link 41 without interference with the edge of its platform.

Primary link 41 is rotatably connected to a secondary link 42 (FIG. 9), which is secured to a yaw actuator 45 mounted on the next adjacent platform segment (platform 21 in FIG. 9). Secondary link 42 is a shorter version of primary link 41, having spaced shorter legs 42a joined by a base member 42b. As with primary link, the free ends of legs 42a are joined to a yaw actuator 45 with legs 42a embracing the platform and base leg 42b being spaced from the edge of the platform to allow a degree of motion without interference with the edge of the platform.

Each yaw actuator 45 comprises a motor or servo unit 46 which differentially extends or retracts pins or pistons 47. Pistons 47 are connected at their free ends to a plate 49 which is mounted to a pivot member 48. The free ends of legs 41a or 42a respectively are connected to pivot member 48. By differentially extending and retracting pistons 47, one rotates plate 49 and pivot member 48. This in turn causes link 40 to pivot.

The free ends of the legs 41 are similarly connected to pivot member 48 in their respective yaw actuator 45. By rotating link 40 at only one end, the adjacent units 10 and 10' pivot laterally relative to one another (FIG. 8). By rotating link 40 at both ends, the adjacent units yaw relative to one another (FIG. 7).

An alternate embodiment of yaw actuator 45 between units 10 and 10' is shown in FIG. 22. Yaw joint 55 comprises a linear bearing 56 which moves laterally on a rod 57. Linear bearing 56 may be driven by a worm gear, solenoid, pneumatic, or hydraulic actuator on platform 22. This is desired if a large amount of torsion is placed on the multi-unit robot from the offset clamping forces between units 10 and 10'. This alternative embodiment does not facilitate lateral pivoting of the adjacent carriages relative to one another.

Figure 14:
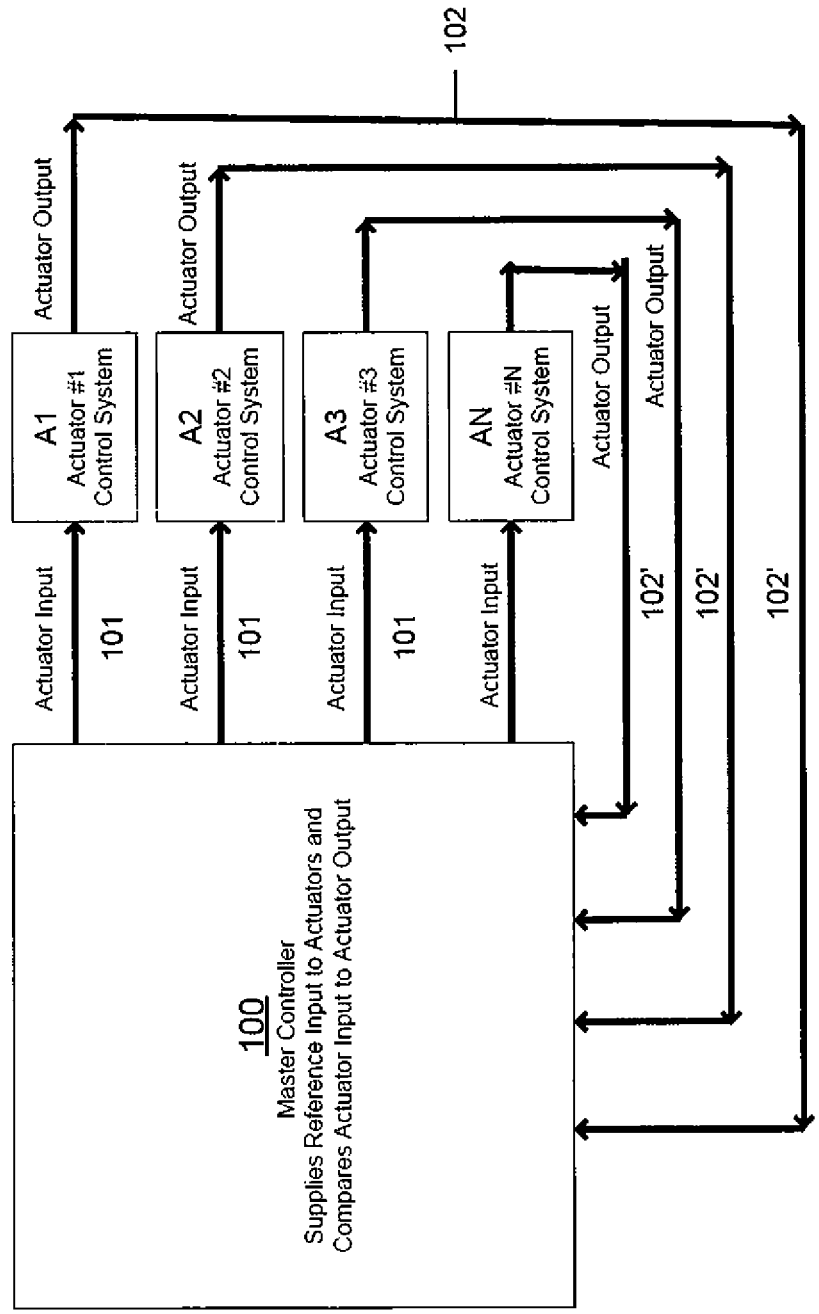
FIG. 14 is a schematic view of a control system for the multi-unit mobile robot.

The roll motion between adjacent units 10 and 10' may be controlled or uncontrolled, and is achieved by the rotatable connection between the primary link 41 and secondary link 42 (FIG. 9). This rotatable connection is made by a pin or axel 43 between the base legs 41b and 42b of primary link 41 and secondary link 42. The rotatable connection allows adjacent units 10 and 10' to roll relative to one another, to accommodate surface variations (e.g. tapered airfoil or tower). If the wheels are not in intimate contract with the work surface some degree of roll control is required to keep the robot from freely rotating. This can be as simple as a roll joint locking feature (a cylinoid with a pin on it would be sufficient) or an electric motor connected to control unit 100 (FIG. 14). Cylinoids are electromagnets that act as an "on-off" actuator.

Each Mecanum wheel 15 contains a series of rollers 16 attached to its circumference, each having an axis of rotation of about 45° to the vertical plane of the wheel (FIGS. 1 and 5). Each wheel 15 includes its own individual drive motor, or motion actuator 17. Each motion actuator 17, identified by letters "a", "b", "c", and "d", is individually connected to a control unit 100 (FIG. 14) such that the wheels can be instructed to rotate in the same direction at the same speed, in the same direction differentially, in opposite directions at the same speed, or in opposite directions differentially. In this way, each unit can be made to move sideways, diagonally or straightforward or straight backwards.

In FIG. 5, the wheels 15 and their rollers 16 for two adjacent robot units 10' and 10 have been labeled with the letters "a" and "b" for robot unit 10' and "c" and "d" for robot unit 10. By rotating all wheels in the same direction at the same speed, the robot units move in that direction at the same speed. By rotating wheels 15c and 15d to the right as viewed in FIG. 5, and wheels 15b and 15a to the left, both robot units 10 and 10' will shift laterally upwardly as viewed in FIG. 5. By reversing those directions, the units will shift downwardly as viewed in FIG. 5. By rotating wheels 15b and 15c to the right, and wheels 15a and 15d to the left, the units will rotate in a clockwise direction. Reversing those directions will cause the units to rotate in a counterclockwise direction. A table indicating these motions with reference to the adjacent sketch is set forth below.

TABLE 1

| Direction of Movement | Wheel Actuation |
|---|---|
| Right | All Wheels Right Same Speed |
| Left | All Wheels Left Same Speed |
| Up | Wheels 15c, 15d Right; 15a, 15b Left |
| Down | Wheels 15a, 15b Right; 15c, 15d Left |
| CW Rotate | Wheels 15c, 15b Right; 15a, 15d Left |
| CCW Rotate | Wheels 15a, 15d Right; 15c, 15b Left |

By thus individually controlling the speed and direction of motion actuators 17 independently, the entire multi-unit robot device can be made to traverse the work surface in any direction, forward, backward, laterally left, laterally right and any direction there between. Clockwise and counterclockwise rotation will typically be used for small adjustments only. For unbiased motion, the total number of Mecanum wheels need to be divisible by four.

Figure 10:
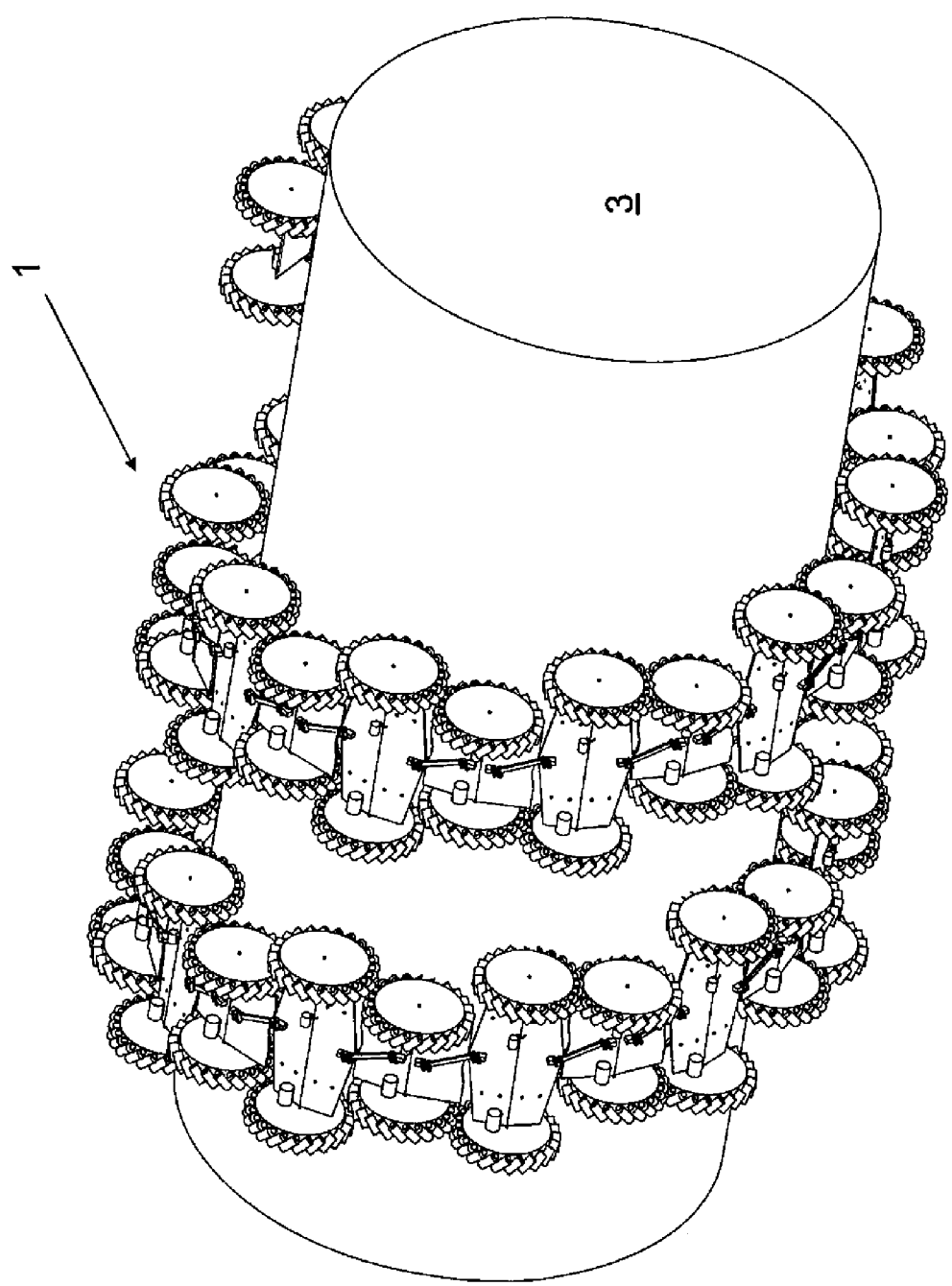
FIG. 10 is a perspective view of a multi-unit mobile robot wrapped around a cylindrical object 3 in an arbitrary orientation.

Through use of the pitch and yaw motions, the entire multi-unit train can wrap around a work surface with laterally offset, overlapping ends (FIG. 10). The pitch motion which can be achieved by pitching the platform segments 21, 22 or 21', 22' relative to each other has been discussed above in connection with the clamping action of the device against the work surface. The pitch function can also be used to assist the robotic device in rising up to clear obstacles (FIG. 11).

Figure 13:
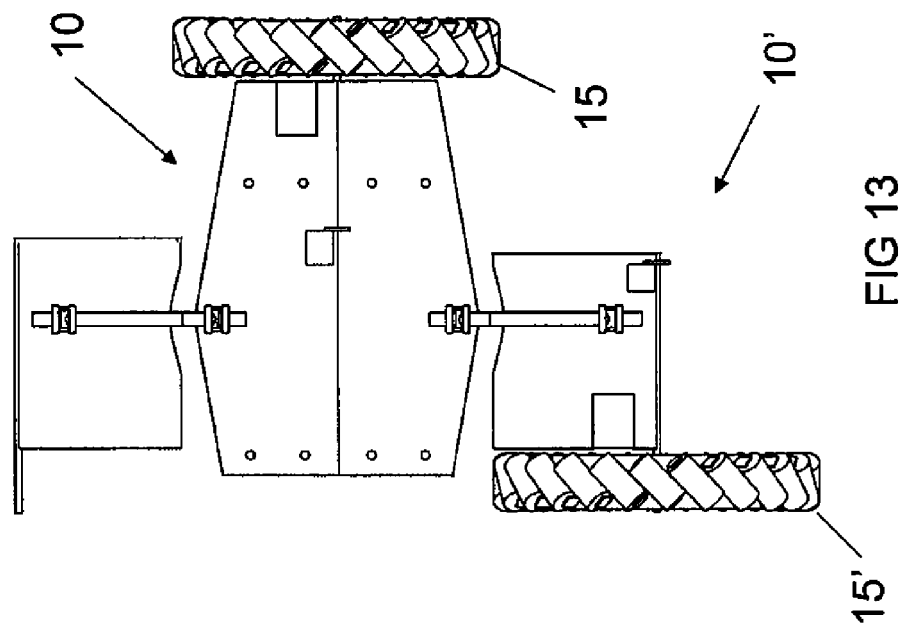
FIG. 13 is a perspective view of an alternative embodiment in which each robot unit is supported by only one wheel instead of two.
Figure 12:
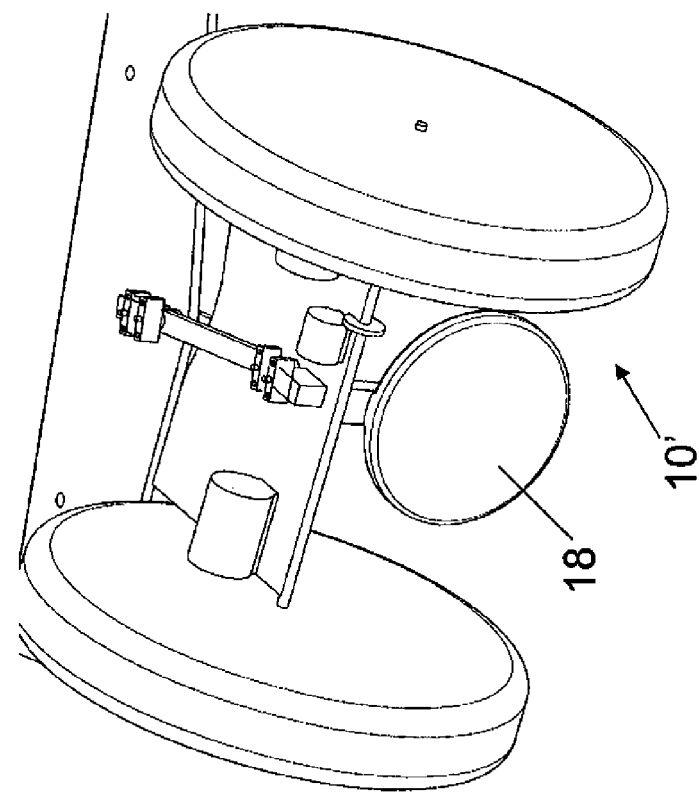
FIG. 12 is a perspective view of an alternative robot unit having a third wheel for lateral motion control.

FIG. 12 shows an alternative embodiment in which a third wheel 18 is provided for lateral motion control, instead of using Mecanum wheels. Wheel 18 is powered, and would be lowered to engage the work surface for lateral movement, or raised off of the work surface for other motion. FIG. 13 shows an alternative embodiment in which each unit 10 or 10' includes only one wheel 15 or 15', with the wheels oriented on alternating sides of alternating units.

For safety and operations, the multi-unit robot 1 should always envelop at least one complete revolution of the object it is traversing to ensure adequate clamping force and payload coverage. The desired length of robot 1 is determined by the largest diameter of the work object of interest. Unused units 10, 10' will form a helix around the object for smaller diameters and payload components may be activated and deactivated as required. This embodiment is preferred but not required, as the multi-unit robot 1 only needs to envelop at least 180° to adhere to the work surface.

Figure 19:
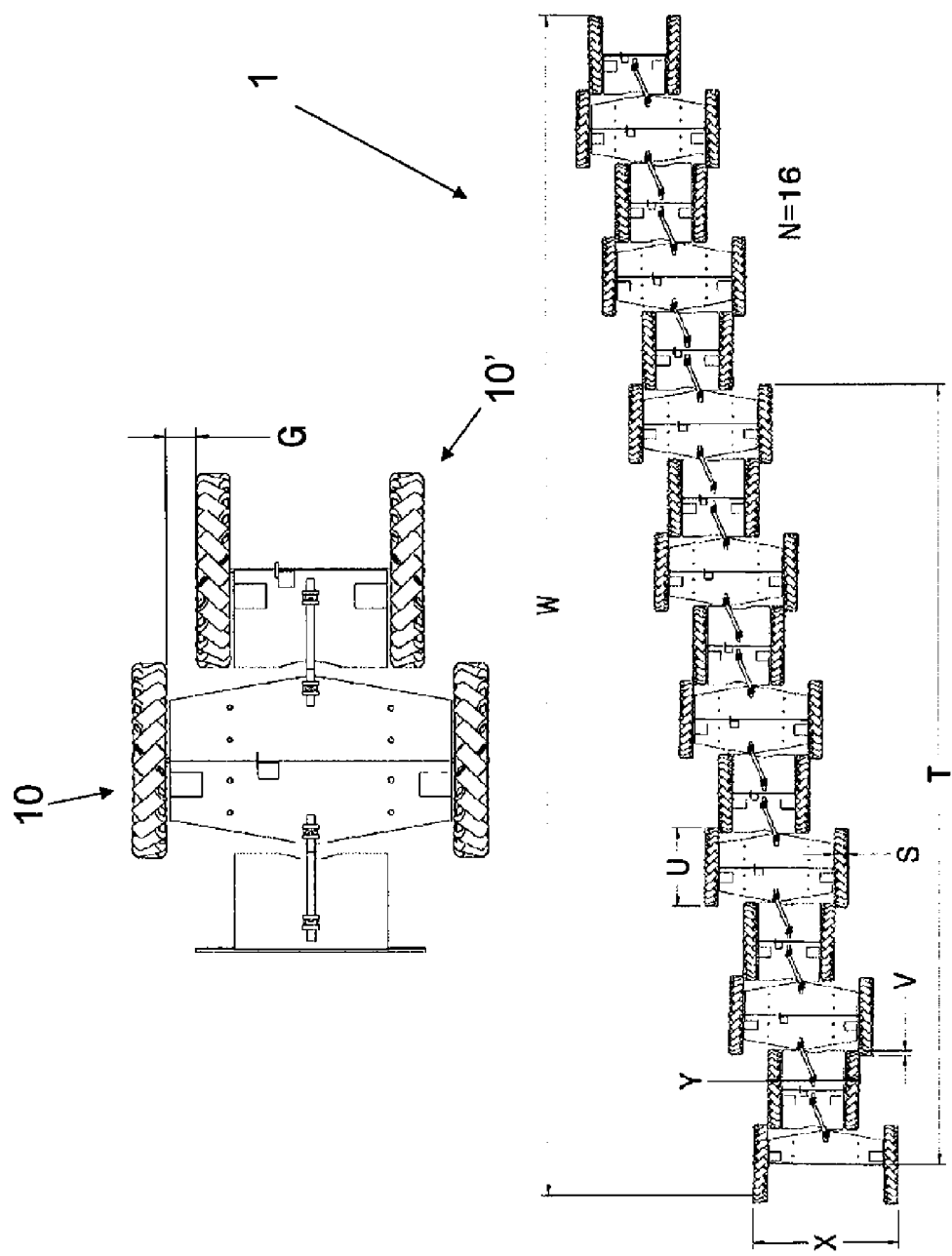
FIG. 19 is a graphical representation of the variables in equations (1) through (7)

It is thus preferable that the multi-unit robot 10 is able to wrap, or coil, around various objects with a continuous closed surface, without having the lead robot unit interfere with the trailing robot unit. This can be achieved by yawing the units with respect to each other. The number of robot units 10 and 10' required for overlap at the ends without interference (T) is a function of a number of the amount of yaw movement possible from unit to unit. Assuming sufficient clearance between platform segments 21 and 22', and between segments 22 and 21', the gap (G) between overlapping wheels 15 is the limiting factor (FIG. 5). FIG. 19 graphically identifies all of the variables used in formulas 1-7 below.

$$G = ((X - 2S) - Y)/2 \quad (1)$$

Where:
 G=Mecanum Wheel Gap
 X=Wide Unit Width
 Y=Narrow Unit Width
 S=Mecanum Wheel Width The number of units (T) required to ensure clearance at the overlapping ends is then:

$$T = X/G \quad (2)$$

Where:
 T=Minimum units 10 and 10' for Clearance Rounded Up to Nearest Integer X=the width of the wide unit 10
G=the gap between wheels With the number of units required for overlapping clearance known, it is desirable to calculate some baseline geometry requirements for circumnavigation. Another requirement for this is the overall length (W) of robot 1:

$$W = NU - (V(U-1)) \quad (3)$$

Where:
W=Multi-Unit Robot Length
N=Number of Units
V=Wheel Overlap
U=Wheel Diameter The minimum cylinder diameter the multi-unit robot 1 can traverse is:

$$D_{min} = [TU - ((T-1)V)]/pi \quad (4)$$

Where:
$D_{min}$=Minimum Diameter to Ensure Clearance,
T=Minimum units 10 and 10' for Clearance
V=Wheel Overlap
U=Wheel Diameter The maximum cylinder diameter the multi-unit robot 1 can traverse is:

$$D_{max} = 2W/pi \quad (5)$$

Where:
$D_{max}$=Maximum Diameter where multi unit robot 1 encompasses an arc of 180 degrees.
W=Multi-Unit Robot Length The minimum flat plate chord length that can be circumnavigated is:

$$C_{min} = (D_{min} \cdot pi)/2 \quad (6)$$

Where:
C=Minimum Flat Plate Chord
$D_{min}$=Minimum Diameter to Ensure Clearance, The maximum chord length is:

$$C_{max} = (D_{max} pi)/4 \quad (7)$$

Where:
$C_{max}$=Maximum Flat Plate Chord
$D_{max}$=Maximum Diameter where multi unit robot 1 encompasses an arc of 180 degrees.

Table 2 below contains numerical examples of the parameters discussed above:

TABLE 2

| Determination | Description | Parameter (in) |
|---|---|---|
| Defined by Chassis Geometry | Wide Unit Width (X) | 11.5 |
| | Narrow Unit Width (Y) | 7.5 |
| | Wheel Diameter (U) | 6 |
| | Wheel Width (S) | 1 |
| | Wheel Overlap (V) | 0.125 |
| | Number of Units (N) | 16 |
| Calculated | Wheel Gap (G) | 1 |
| | Prototype Length (W) | 94.125 |
| | Minimum Unites for Clearance: Rounded Up (T) | 12 |
| | Minimum Circumnavigate Diameter (cylinder) | 22.48 |
| | Maximum Circumnavigate Diameter (cylinder) | 59.92 |
| | Minimum Chord Length (flat plate) | 35.31 |
| | Maximum Chord Length (flat plate) | 47.06 |

Figure 15:
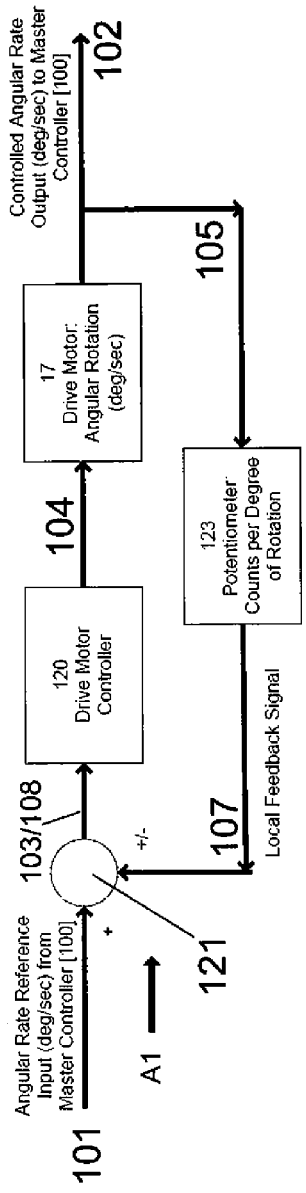
FIG. 15 is a schematic of the actuator control for a motion actuator, which actuates a wheel drive motor.
Figure 16:
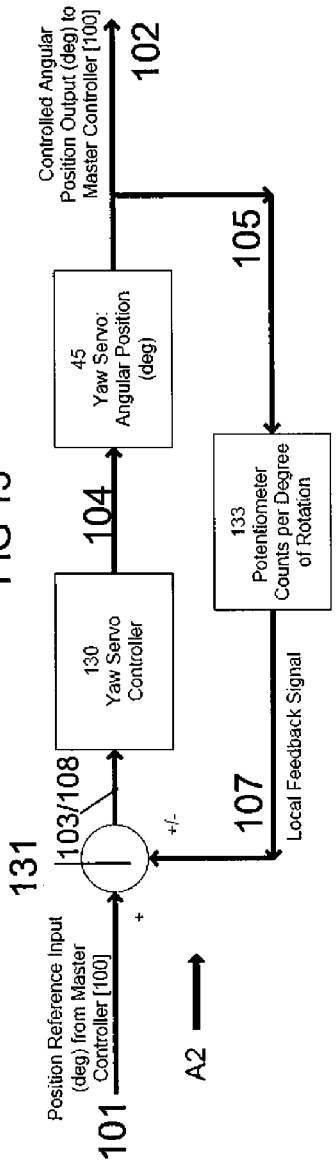
FIG. 16 is a schematic of the actuator control for a yaw actuator.
Figure 17:
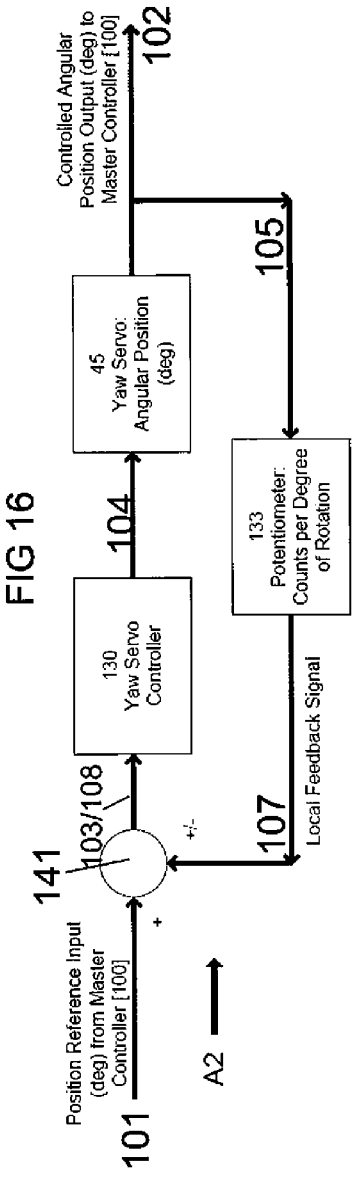
FIG. 17 is a schematic of the actuator control for a pitch actuator.

The entire mobile robotic device 1 can be controlled through a "master controller" computer 100 (FIG. 14). Each motion actuator 17, pitch actuator 30 and yaw actuator 45 will preferably be independently controlled to achieve the desired movement and clamping force on the object multi-unit robot 1 surrounds. Thus master controller computer 100 will independently direct a plurality of individual actuator controls A1, A2, A3, AN, depending on the number required to control all of the pitch, yaw and motion actuators mounted on all of the robot units 10 and 10' (FIG. 14). Each actuator control is located on a unit 10 or 10', and controls one of its four actuators: one motion actuator 17 for each of the two wheels 15 or 15', the pitch actuator 30, and the yaw actuator 45 (FIGS. 15-17). Controller computer 100 is either independently wired to each of the actuator controls in each of the units 10, 10', or controller computer 100 controls each actuator control through wireless connections.

Actuator input from master controller computer 100 is individually directed as indicated by lines 101 to each actuator control A1, A2, A3, . . . AN located on the robot units 10 and 10' (FIG. 14). The actuator control processes the information and directs an actuator 17, 30 or 46 to act on its respective robot unit 10 or 10'. The actuator 17, 30 or 46 provides feedback information to the actuator control, which in turn feeds it back to master controller computer 100, as indicated by feedback lines 102.

FIG. 15 is a schematic of actuator control system A1, which controls a motion actuator 17. Master controller 100 sends angular rate instructions to a unit controller 120 in actuator control A1, as indicated by line 101. This signal passes through a summing point 121 and on to unit controller 120. At the same time, unit controller 120 is receiving a feedback signal through line 107, summing point 121 and line 108, from a potentiometer 123, which is measuring the rate of rotation of motion actuator 17 through feedback line 105. The unit controller 120 is comparing these two inputs and is sending a blended resultant signal via line 104 to motion actuator 17. At the same time, the feedback signal is being fed back to master controller 100 through summing point 121 and feedback line 102

FIG. 16 is a schematic of actuator control system A2 which controls a yaw actuator 45. Master controller 100 sends position input instructions to a unit controller 130 in actuator control A2, as indicated by line 101. This signal passes through a summing point 131 and on to unit controller 130. At the same time, unit controller 130 is receiving a feedback signal through line 107, summing point 131 and line 108, from a potentiometer 133, which is measuring the angular position of yaw actuator 45 through feedback line 105. The unit controller 130 is comparing these two inputs and is sending a blended resultant signal via line 104 to yaw actuator 45. At the same time, the feedback signal is being fed back to master controller 100 through summing point 131 and feedback line 102

FIG. 17 is a schematic of actuator control system A3 which controls a pitch actuator 30. Master controller 100 sends clamping force input instructions to a unit controller 140 in actuator control A3, as indicated by line 101. This signal passes through a summing point 141 and on to unit controller 140. At the same time, unit controller 140 is receiving a feedback signal through line 107, summing point 141 and line 108, from a load cell 143, which is measuring the force exerted by pitch actuator 30 through feedback line 105. The unit controller 140 is comparing these two inputs and is sending a blended resultant signal via line 104 to pitch actuator 30. At the same time, the feedback signal is being fed back to master controller 100 through summing point 141 and feedback line 102.

The configuration of a surface to be cleaned, painted or otherwise treated can be loaded into the computer/controller 100 in a program similar to a CNC machining program. The controller 100 then instructs the robot 1, through various actuator control systems A1-An, on how to move to cover the surface completely. The computer can determine the starting point of robot 1 by the configuration of the robot at whatever point on the work surface it starts at. If desired, robot 1 may be manually controlled by an operator if automated control is not required.

Alternatively, or in addition, location control can be based on an external reference source. This source will relay global position of specific point(s) of reference on the robot units 10 and 10' to the master controller 100. By comparing the external position references to the various unit positions, the controller will have an accurate position reference for each robot unit 10 or 10'. There are several methods of external control. The most common being GPS or ground transmitter in a known position.

Unit position can be determined by feedback from a wide array of sources (e.g. pitch and yaw angle sensors, GPS, known position transmitter, drive motor rates, inertial guidance control, etc.) The unit will relay relevant position data to the payload as required. Precise position control allows for minimal user input and thus facilitates automation of a particular task.

While the multi-unit robot 1 has many uses, the use illustrated and contemplated by this multi-unit mobile robot is that of servicing wind turbine blades and towers. In use, multi-unit robot 1 can be placed on a wind turbine blade, or can simply be placed at the base of the tower. The configuration of the blade, or of the entire tower and blades, is loaded into the computer/controller 100 in a program similar to a CNC machining program. Computer/controller 100 compares the configuration of multi-unit robot 1 to the configuration of the tower or blade to determine the starting position of multi-unit robot 1. In addition, an onboard GPS may be used to communicate position information to computer/controller 100. The computer/controller 100 then instructs the robot 1, through various actuator control systems A1-An, on how to move to proceed to and on the blade in order to cover the surface completely. The multi-unit robot 1 may carry cleaning, painting, and/or other servicing equipment on the platforms 20/21, which computer/controller 100 instructs to both prepare and then paint the surface of the blades or tower.

Figure 20:
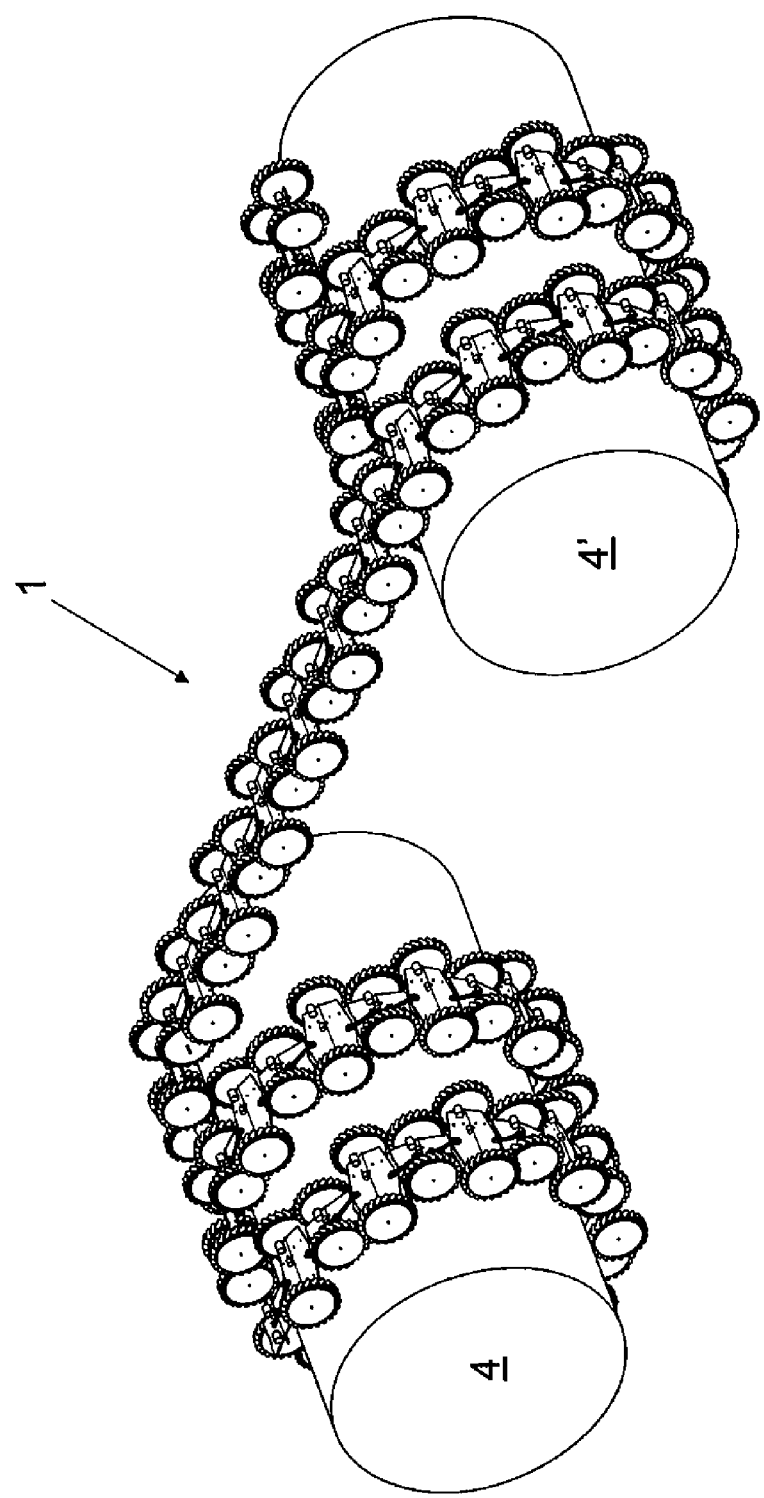
FIG. 20 is a perspective view of a multi-unit mobile robot transferring from one object 4 to another object 4' in an arbitrary orientation.

FIG. 20 illustrates how the robot can transfer from one tower or object 4 to another, 4'. The robot can autonomously move from the tower to the wind turbine blade provided that the blade is rotated so it is parallel with the tower so the robot can make the transfer as illustrated by FIG. 20.

In an alternate embodiment (FIGS. 23 and 24), clamping force may be augmented by use of a flexible device 60 under tension, e.g. tether, rope, or chain connecting the lead and trailing mobile units 10 and/or 10' of the multi-unit mobile robot. Device 60 may contain integrated features that allow it transversely slip along the work surface such as rollers or bearings. In an alternate embodiment (FIG. 25), two robots 1 and 1' may be connected by flexible devices 60 and 60' under tension to maintain clamping force. Note that in this configuration, it is no longer required that robot 1 envelope 180°.

Of course, it is understood that the foregoing is a description of preferred embodiments of the invention, and various changes and alterations can be made without departing from the spirit of the invention.

The invention claimed is:

1. A multi-unit mobile robot comprising:
   a plurality of separate mobile units linked together by linkages;
   each said mobile unit including at least one wheel, and each said mobile unit comprising hinged first and second segments, hinges for said segments being adapted to facilitate pitch relative motion between said segments; and
   control actuators operably connected to said hinges, operable to cause said robot to coil around and compress against exterior, or compress against interior, of an object to be traversed, wherein:
   said wheels on said mobile units are Mecanum wheels each driven independently by a motor, a controller being associated with each said motor, whereby through operation of said controllers, said multi-unit mobile robot can be moved in any direction;
   pitch axis of each said hinges is concentric with axis of rotation of said Mecanum wheels,
   there are a pair of said Mecanum wheels for each pair of said hinged segments, one on each side of the segments; and
   alternating ones of said mobile units are of differing widths, and said Mecanum wheels adjacent the mobile units are sufficiently large such that said Mecanum wheels are capable of overlapping, thereby enabling the multi-unit mobile robot to navigate very sharp edges or corners in a surface of and object being traversed by said robot, with said Mecanum wheels maintaining contact with the surface being traversed.

2. The multi-unit mobile robot of claim 1, in which at least some of said linkages are adapted to facilitate at least one of lateral pivot or yaw relative motion between said mobile units; control actuators operably connected to said linkages, operable to allow said multi-unit mobile robot to wrap around and coil against the object in a helical fashion.

3. The multi-unit mobile robot of claim 2, in which at least some of said linkages are adapted to facilitate roll relative motion between said mobile units, allowing the wheels of said units to maintain contact with an irregular work surface.

4. The multi-unit mobile robot of claim 3, in which there is an actuator for each said hinge and for each said linkage.

5. The multi-unit mobile robot of claim 2 in which said linkage is adapted to facilitate lateral yaw motion between adjacent mobile units.

6. The multi-unit mobile robot of claim 1 comprising a master controller computer, which provides a plurality of individual controllers, each operably connected to one of said control actuators and to one of said motors, for independent control thereof to achieve desired movement and clamping force on the object.

7. The multi-unit mobile robot of claim 6 in which each said actuator and motor provides feedback information to the corresponding individual controller, which in turn feeds said information back to said master controller.

8. The multi-unit robot of claim 7 in which said master controller computer is adapted to receive and read configuration of a surface of an object to be cleaned, painted or otherwise treated or traversed, as loaded into said master controller computer, said master controller being adapted to instruct said multi-unit mobile robot, through the individual controllers, on how to move to cover the surface completely.

9. The multi-unit robot of claim 7 in which global position of specific point(s) of reference on said mobile robot units is sent to said master controller computer; said master controller computer being adapted to compare said global positions to positions of the various mobile units, whereby said master controller will have an accurate position reference for each said mobile unit.

10. The multi-unit robot of claim 7 in which global position of specific point(s) of reference on said mobile robot units is sent to said master controller computer; said master controller computer being adapted to compare said global positions to positions of the various mobile units, whereby said master controller will have an accurate position reference for each said mobile unit.

11. The multi-unit mobile robot of claim 7, in which at least some of said linkages are adapted to facilitate at least one of lateral pivot or yaw relative motion between said mobile units; control actuators operably connected to said linkages, operable to allow said multi-unit mobile robot to wrap around and coil against the object in a helical fashion; said master controller including a plurality of individual controllers operably connected to said control actuators for said linkages, for independent control thereof.

12. The multi-unit mobile robot of claim 6, in which at least some of said linkages are adapted to facilitate at least one of lateral pivot or yaw relative motion between said mobile units; control actuators operably connected to said linkages, operable to allow said multi-unit mobile robot to wrap around and coil against the object in a helical fashion; said master controller including a plurality of individual controllers operably connected to said control actuators for said linkages, for independent control thereof.

13. The multi-unit mobile robot of claim 1 in which clamping force is augmented by a tension generating member connecting lead and trailing mobile units of the multi-unit mobile robot.

14. The multi-unit mobile robot of claim 13 in which said tension generating member contains features that allow the memeber to transversely slip along the work surface being traversed.

15. A method of servicing windmill blades and towers comprising;
   providing a multi-unit mobile robot of claim 1; and
   directing the multi-unit mobile robot to wrap around, compress against, and traverse exterior of a windmill blade or tower, while cleaning, inspecting, resurfacing or painting the blade or tower.

16. A method of carrying cargo up and down windmill towers comprising;
   providing a multi-unit mobile robot of claim 1;
   joining cargo to the multi-tool robot; and
   directing the multi-unit mobile robot to wrap around, compress against, and traverse a windmill tower with the cargo.

* * * * *